US010283834B2

(12) United States Patent
Cherubini et al.

(10) Patent No.: US 10,283,834 B2
(45) Date of Patent: May 7, 2019

(54) METHODS AND APPARATUSES FOR VERSATILE BEAMFORMING

(71) Applicant: International Business Machines Corporation, Armonk, NY (US)

(72) Inventors: Giovanni Cherubini, Rueschlikon (CH); Paul Hurley, Lausanne (CH); Matthieu Simeoni, Oberrieden (CH)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 15/053,662

(22) Filed: Feb. 25, 2016

(65) Prior Publication Data
US 2017/0250468 A1 Aug. 31, 2017

(51) Int. Cl.
*H04W 16/20* (2009.01)
*H01Q 1/00* (2006.01)
(Continued)

(52) U.S. Cl.
CPC ............... *H01Q 1/007* (2013.01); *H01Q 3/40* (2013.01); *H04B 7/043* (2013.01); *H04B 7/0408* (2013.01);
(Continued)

(58) Field of Classification Search
CPC .... H04B 7/0617; H04B 7/086; H04B 7/0865; H04B 7/0408; H04B 7/043; H04B 7/046;
(Continued)

(56) References Cited

U.S. PATENT DOCUMENTS 7,626,889 B2  12/2009  Seltzer et al.
8,971,438 B2   3/2015  Baik et al.
(Continued)

FOREIGN PATENT DOCUMENTS

EP       1 341 315 B1      3/2009
WO    WO-9315531 A1  *  8/1993    .......... H01Q 3/2676

OTHER PUBLICATIONS

Bucci et al. "Antenna Pattern Synthesis: A New General Approach". Proceedings of the IEEE, vol. 82, No. 3. Mar. 1994. pp. 358-371. (Year: 1994).*

(Continued)

*Primary Examiner* — Gregory C. Issing
(74) *Attorney, Agent, or Firm* — Scully, Scott, Murphy & Presser, P.C.; Daniel Morris, Esq.

(57) ABSTRACT

The present invention is directed to methods and apparatuses for beamforming signals or compute beamformed signals. The present approach is to determine a series of beams from or for a set of devices configured for receiving signals from and/or transmitting signals to one or more regions of interest in an n-dimensional space, with n=2 or 3. Each of the devices has a known position $p_i$ within said n-dimensional space. Signals are to be respectively transmitted or received non-uniformly in this space, i.e., according to the particular regions of interest. During a first phase, operations are performed in order to successively obtain a spatial filter function $\hat{\omega}(r)$, a beamforming function $\omega(p)$, and beamforming weights $\omega(p_i)$. The spatial filter function $\hat{\omega}(r)$ matches projections of the regions of interest onto an n−1-dimensional sphere centered on said set of devices. The function $\hat{\omega}(r)$, however, extends over the n-dimensional space and does not restrict to the n−1-dimensional sphere. During a second phase, delays and gains are suitably introduced in the signals, by weighting time-series according to beamforming weights $\omega(p_i)$ obtained during the first phase.

23 Claims, 11 Drawing Sheets

(51) Int. Cl.

| | | |
|---|---|---|
| *H04B 7/0408* | (2017.01) | |
| *H04W 16/28* | (2009.01) | |
| *H04B 7/06* | (2006.01) | |
| *H04B 7/08* | (2006.01) | |
| *H04B 7/0426* | (2017.01) | |
| *H01Q 3/40* | (2006.01) | |

(52) U.S. Cl.
CPC ........... *H04B 7/0617* (2013.01); *H04B 7/086* (2013.01); *H04W 16/20* (2013.01); *H04W 16/28* (2013.01)

(58) Field of Classification Search
CPC . H04W 16/28; H04W 72/046; H04W 40/023; H04W 40/205; H04W 84/12
USPC ......................................................... 342/377
See application file for complete search history.

(56) References Cited

U.S. PATENT DOCUMENTS

| | | | |
|---|---|---|---|
| 9,078,142 B1 | 7/2015 | Zhan et al. | |
| 2006/0033659 A1* | 2/2006 | Strickland | H01Q 3/26 342/372 |
| 2013/0335270 A1* | 12/2013 | Edelmann | H01Q 3/34 342/372 |
| 2015/0263835 A1 | 9/2015 | Shattil | |
| 2015/0311962 A1 | 10/2015 | Maltsev et al. | |

OTHER PUBLICATIONS

Isernia et al. "Shaped Beam Antenna Sysnthesis Problems: Feasibility Criteria and New Strategies". Journal of Electromagnetic Waves and Applications. vol. 12, pp. 103-138. 1998. (Year: 1998).*
Hua et al. "Pattern Synthesis for Large Planar Antenna Arrays Using a Modified Alternating Projection Method". Progress in Electromagnetics Research M, vol. 37, pp. 149-160. 2014. (Year: 2014).*
Wang et al. "An Improved Antenna Array Pattern Synthesis Method Using Fast Fourier Transforms". Hindawi Publishing Corporation International Journal of Antennas and Propagation vol. 2015. pp. 1-9. (Year: 2015).*
Picazo et al. "Synthesis of Shaped Beam Antenna Patterns Using Window Currents". IEEE pp. 1196-1198. 1998. (Year: 1998).*
Kapoor et al., "Advancement in GSM and Wi-Fi technology Using Smart Antenna", International Journal of Research (IJR), vol. 1, Issue-10, Nov. 2014, ISSN 2348-6848, pp. 973-977.
Gast, 802.11 ac: A survival guide. O'Reilly Media, Inc., (Book) First published: Aug. 15, 2013.
Ocal et al., "Collaborative randomized beamforming for phased array radio interferometers," in Acoustics, Speech and Signal Processing (ICASSP), 2015 IEEE International Conference on, Apr. 19-24, 2015, pp. 5654-5658.
Synnevag et al., "Adaptive beamforming applied to medical ultrasound imaging," Ultrasonics, Ferroelectrics, and Frequency Control, IEEE Transactions on, vol. 54, No. 8, Aug. 2007, pp. 1606-1613.
Wagner et al., "Compressed beamforming in ultrasound imaging," Signal Processing, IEEE Transactions on, vol. 60, No. 9, Sep. 2012, pp. 4643-4657.
Veen et al., "Beamforming: a versatile approach to spatial filtering," ASSP Magazine, IEEE, vol. 5, No. 2, Apr. 1988, pp. 4-24.

* cited by examiner

METHODS AND APPARATUSES FOR VERSATILE BEAMFORMING

BACKGROUND

The invention relates in general to the field of beamforming techniques. In particular, it concerns apparatuses and methods for beamforming signals or computing beamformed signals, by explicitly targeting designed regions of interest.

Wifi networks in general are often perceived as being rather inefficient, inasmuch as signal goes where it is not necessarily needed, while dead zones may occur where the signal barely reaches. Moreover, rather than being equally distributed around or away from a router, end devices tend to get more and more mobile, i.e., they move around the routers with increasing vigor as users, e.g., walk with their smartphone or tablet, at home or in public networks.

Newer Wifi standards, 802.11n and more recently 802.11ac, provide improvements, wherein multiple antennas are deployed and the location of devices can be detected (either passively or with help of explicit status communication) so as to use multiple-input and multiple-output methods, or MIMO, which involve beamforming. The effect is some increased network capacity, and a level of concentration of energy to where it is needed.

Mobile phone networks (3G, 4G, and in the future 5G), have similar issues over a wider area, though engineered for far more devices per transmitter. Such network must, by definition, cope with people moving (walking, running, or in a vehicle). The problem is made even more complicated than in the Wifi case due to variability in elevation. In order to beamform, ever increasing numbers of antennas per mast are deployed. Given the number of devices, it is impossible to even contemplate focusing beams on any single device/user.

Besides, beamforming is an intrinsic part of modern ultrasound. An ultrasound probe is essentially an array of transducers, responsible for both transmitting sound waves, and receiving the resultant echoes. Transmit beamforming cleverly plays with the timing of the sound pulse sent from each transducer, so as to induce constructive wave interference and aim at focusing at a certain angle into the body or object to a desired depth. The resultant echoes are then picked up by the transducers, and digitally beamformed, so as to target the echo signals to focus on the same desired depth and angle.

In yet another technical field, modern large-scale radio telescope arrays use massive numbers of antennas, i.e., tens of thousands, with up to the order of a million for the future Square Kilometer Array. The shear volume of data makes it neither feasible to transmit it to a central location nor to correlate the outputs of each pair of antennas. Thus, beamforming is deployed on groups of antennas primarily as a method for data reduction, but also in an attempt to focus on a single part of the sky.

In the prior art, there are advantages of implementing a Minimum variance distortionless response (MVDR) beamformer in ultrasound, as opposed to the standard focused beamformer (here called delay-and-sum). MVDR beamforming seeks to achieve focused beamforming by adapting its weights based on the signal to be beamformed. Focused beamforming for ultrasound in a compressed fashion my be achieved.

Previous beamforming techniques are perceived to lack flexibility. Some attempts for filtering in a discrete manner have been made, but the proposed techniques are perceived to be either too restrictive in array layout, or involve ill-posed optimization problems that could result in beamforming coefficients with very large moduli, and hence an unreliable beamshape.

SUMMARY

The present invention is notably directed to methods and apparatuses for beamforming signals or compute beamformed signals. Such signals are to be respectively transmitted or received non-uniformly in a 2- or 3-dimensional space, i.e., according to particular regions of interest.

To that aim, the present approach relies on two phases. During a first phase, operations are performed in order to successively obtain a spatial filter function $\hat{\omega}(r)$, a beamforming function $\omega(p)$, and beamforming weights $\omega(p_i)$. During a second phase, delays and gains are suitably introduced in the signals, by weighting time-series according to beamforming weights $\omega(p_i)$ obtained during the first phase. Typically, the first phase is completed during a configuration time, whereas the second phase corresponds to run-time operations.

More in detail, the present approach aims at determining a series of beams from or for a set of devices $\{A_i\}_{i=1,\ldots,L}$. Such devices are configured for receiving signals from and/or transmitting signals to one or more regions $\{R_m\}_{m=1,\ldots,M}$ of interest, i.e., preferential regions in an n-dimensional space (or n-space), where n=2 or 3. Each of the devices has a known position $p_i$ in the n-space.

To that aim, a n-dimensional spatial filter function $\omega(r)$ is determined, which matches projections $\{P_m\}_{m=1,\ldots,M}$ of the one or more regions $\{R_m\}_{m=1,\ldots,M}$ of interest onto an n−1-dimensional sphere centered on said set of devices. Then, a beamforming function $\omega(p)$ is obtained, based on a Fourier transform of the determined spatial filter function. Next, for each of the devices $\{A_i\}_{i=1,\ldots,L}$, a beamforming weight $\omega(p_i)$ is determined by evaluating the obtained beamforming function $\omega(p)$ at a known position $p_i$ of said each of the devices $\{A_i\}_{i=1,\ldots,L}$, which completes the first phase.

During the second phase, delays and gains are introduced, by weighting time-series from or for the devices $\{A_i\}_{i=1,\ldots,L}$, using beamforming weights $\omega(p_i)$ as respectively determined for the devices. Namely, each time series received from or to be transmitted to a distinct one $A_i$ of the devices is weighted by a beamforming weight $\omega(p_i)$ as determined for said distinct one $A_i$ of the devices.

The operative principle used in the second phase remains the same, that signals be transmitted or received. For example, in a transmission case, signals are beamformed by introducing delays and gains as described above, i.e., by weighting time-series which can then be forwarded to respective transmitters (e.g., antennas of a Wifi router), for subsequent transmission to final receivers (e.g., end-users or signals consumers, such as laptops, smartphones, etc.). For reception, signals are sent by initial transmitters (e.g., the same end-users) to receivers (e.g., the same antennas). Thus, if the above devices $\{A_i\}_{i=1,\ldots,L}$ are transmitters, these can be regarded as initial transmitters, transmitting signals to final receivers. In reception, the devices $\{A_i\}_{i=1,\ldots,L}$ are final receivers.

Interestingly, the present approach makes it possible to focus on specific regions of interest. Aiming for areas rather than points minimizes the required update rate and reduces the requirement for communication. The techniques used herein allow wider ranges of directions to be covered than with matched beamforming techniques. That is, for matched beamforming to cover a same range as with the present approach (all things being otherwise equal), one would have to steer matched beamforming toward many directions within that range, as discussed in detail below. Moreover, and as illustrated in the accompanying drawings, the present solution typically gives rise to less aliasing artifacts (e.g., side-lobes) in the beamshapes.

The present solution can advantageously be used in various applications, including mobile telecommunication networks, Wifi, radio astronomy and ultrasound apparatuses. Thus, the devices $\{A_i\}_{i=1,\ldots,L}$ may be receivers, transmitters or transceivers (or transducers).

In embodiments, the spatial filter $\hat{\omega}(r)$ is obtained based on a preference function, which identifies the regions of interest $\{R_m\}_{m=1,\ldots,M}$, in $\mathbb{R}^n$. Such regions can be regarded as preferential regions, from where or to where signals need mostly be sent, e.g., because of a non-uniform distribution, or concentration of the end-users. Accordingly, signals can be sent with higher intensity to or from such regions. As the regions of interest may evolve, the preference function may change accordingly, thereby triggering a re-configuration, leading to updated beamforming weights $\omega(p_i)$. The present approach is therefore perceived as versatile, compared to known approaches.

Having identified one or more regions thanks to the preference function, the regions can then be projected onto a n–1-dimensional sphere (or "n–1-sphere", for short). This way, an angular filter $\hat{\omega}_a(r)$, also referred to as "target filter" in this document, can be obtained, based on the projections.

Note that:
A 1-sphere is a circle and is the boundary of a disk (also called a 2-ball); and
A 2-sphere is an ordinary sphere in 3-dimensional Euclidean space, and is the boundary of an ordinary ball (also called 3-ball).

Projecting one or more regions of interest onto an n–1-sphere gives rise to one or more "surface" portions, respectively. Thus, the projections $\{P_m\}_{m=1,\ldots,M}$ corresponds to respective surface portions. A surface portion accordingly obtained is an arc of a circle if n=2 or a surface portion of an ordinary sphere if n=3, where said circle is a 1-sphere and said sphere is a 2-sphere.

For completeness, projections on an n–1-sphere correspond to n–1-dimensional angles that said regions subtend at the center of the n–1-sphere. Such angles are planar angles when n=2 or solid angles when n=3; they corresponds to projections (or equivalently surface portions) as the set of devices "see" them from within the n–1-sphere, assuming that this sphere is large enough to contain each of the devices. However, the actual size of this sphere has little importance, for reasons that will become apparent later. Thus, an n–1-sphere as considered herein is typically a unit sphere (in the n–1-space).

Remarkably, the function $\hat{\omega}(r)$ extends (i.e., takes values) in $\mathbb{R}^n$ while the projections are n–1-dimensional objects. That is, the function $\hat{\omega}(r)$ "extends" the projections $\{P_m\}_{m=1,\ldots,M}$ over $\mathbb{R}^n$ and, as such, are "thicker" objects, defined a space of larger dimension than the projection.

The spatial filter function $\hat{\omega}(r)$ plays an important role, inasmuch as it matches the projections of the regions onto the n–1-sphere. For instance, the function $\hat{\omega}(r)$ may be constrained to take the same values as the angular filter $\hat{\omega}_a(r)$ on the n–1-sphere. The determined function $\hat{\omega}(r)$ will otherwise typically exhibit peaks that coincide with maxima of such projections, on the n–1-sphere. When considering such peaks as objects extending in $\mathbb{R}^n$ (which they are, as opposed to the angular filter that is restricted to the n–1-sphere), then such peaks typically circumscribe or tightly encompass the projections on the n–1-sphere. As said earlier, $\hat{\omega}(r)$ "extends" the angular function in $\mathbb{R}^n$, notably radially (i.e., perpendicular to the n–1-sphere) and is a "thicker" object than $\hat{\omega}_a(r)$. As present inventors have realized, $\hat{\omega}(r)$ indeed need be "thicker" than $\hat{\omega}_a(r)$ as considering an object restricted to the sole n–1-sphere (like $\hat{\omega}_a$) would make it impossible to recover a beamforming function.

As explained later in detail, one or more peaks of $\hat{\omega}(r)$ may be used to match projections of the regions of interest. The terminology "peak" is to be understood broadly here: a peak reflects values taken by $\hat{\omega}(r)$ in a given portion of the 2- or 3-space, where $\hat{\omega}(r)$ takes higher values than around this portion. A peak may even be a 2-dimensional rectangular (or boxcar) function, i.e., involve an infinite number of local maxima.

Preferably, $\hat{\omega}(r)$ is a L2-function, i.e., it is square-integrable over $\mathbb{R}^n$ and is finite, which implies that $|\hat{\omega}(r)| \to 0$ as $|r| \to \infty$. As a L2-function, $\hat{\omega}(r)$ suitably behave for it to potentially match projected regions. More preferably, the function $\omega(r)$ is one that satisfies all Dirichlet conditions, for it to be Fourier transformable. While $\hat{\omega}(r)$ may, in some cases, be always positive, $\forall r$ in $\mathbb{R}^n$, the function $\hat{\omega}(r)$ may, in other cases, be chosen to be partly negative. I.e., negativity could be desirable in some cases, for example when using the method to expand an incoming signal in a desirable basis, which elements may be negative. More generally, the function $\hat{\omega}(r)$ may be complex.

Preferably, the functions $\hat{\omega}(r)$ is constructed based on known, well-defined analytical functions, for which analytical Fourier transforms are known, such that no explicit Fourier transformation is involved. Thus, the beamforming function $\omega(p)$ can be obtained based on readily available, analytical Fourier transforms. Accordingly, no numerical Fourier transformation is involved in that case, so as to avoid numerical instabilities as typically caused by numerical transforms.

Depending on the complexity desired for the spatial filter function $\hat{\omega}(r)$, one or more (e.g., a sum of) basis functions may be involved in its construction, where each basis function has a defined, analytical Fourier transform. Using a sum of basis function makes it possible to closely fit a variety of target functions, even functions having cusps or edges.

The spatial filter function $\hat{\omega}(r)$ may for instance be determined as a sum of Gaussian functions. This is advantageous as contractions of even a few Gaussians can be used to fit a wide range of target functions, including functions having cusps, and, this, to a reasonable approximation. Furthermore, Gaussian functions allow for an easy representation in each of the direct space and the transformed space. A Gaussian function that is localized in one space, will be diffuse in the transformed space. However, as the transform of a Gaussian is still a Gaussian, the transformed function is still well-behaved; this avoids spurious effects when computing the weight coefficients and simplifies the computation of such coefficients. In other words, well-behaved coefficients can be obtained, which lead to clean beams.

In variants, ball indicator functions may be used. In other variants, a combination of different types of functions may be used (in a weighted sum of such functions). E.g., one may simultaneously use ball indicator functions, Gaussian functions, Slater functions, etc., where some of the Gaussian/Slater functions may, if necessary, be parameterized so as to approach a Dirac distributions. This, in turn, allow more complex filters to be approximated.

In still other variants, however, one may rely on "substitute" functions, which do not satisfy Dirichlet conditions, but which locally behave well, e.g., take the same (or almost the same) values as known, transformable functions. The function $\hat{\omega}(r)$ may for instance be written as a weighted (finite) sum of sine and/or cosine functions, fitting to the angular filter $\hat{\omega}_a(r)$ on the n−1-sphere, while the transform of $\hat{\omega}(r)$ is taken as an integral over a finite domain (which again yields analytical formula). More generally, the one skilled in the art will appreciate that many basis functions may be contemplated.

The determination of the spatial filter function $\hat{\omega}(r)$ may decompose into several sub-steps. For instance, and as evoked earlier, a preference function may be accessed, prior to determining the spatial filter, in order to identify the regions $\{R_m\}_{m=1,\ldots,M}$ of interest. Then, the regions as identified by the preference function can be projected onto the n−1-sphere, to obtain projections $\{P_m\}_{m=1,\ldots,M}$.

Next, as evoked earlier, an angular filter function $\hat{\omega}_a(r)$ can be constructed based on the obtained projections, i.e., so as to reflect values taken by the projections on the n−1-sphere. As per its construction, the function $\hat{\omega}_a(r)$ is defined on the sole n−1-sphere. Yet, the spatial filter function $\hat{\omega}(r)$ can then be easily obtained by extending the angular filter function $\hat{\omega}_a(r)$ to $\mathbb{R}^n$.

Consistently with above considerations as to the peaks of the function $\hat{\omega}(r)$, we note that the latter shall preferably exhibit, on the n−1-sphere, maxima that respectively match maxima of the projections, so as to suitably reflect the angular distribution of such regions. Now, and depending on the basis functions used, the function $\hat{\omega}(r)$ may have more (or less) local maxima than the projections of the regions on the n−1-sphere.

In simple cases, the angular filters may take on the value 1 on certain "arcs", i.e., portions of the n−1-sphere (corresponding to projected regions), and 0 outside, e.g., if regions are initially identified in a binary way rather than with a density map. In such cases, the basis functions may be suitably chosen so as for the function $\hat{\omega}(r)$ to faithfully reflect the angular function (on the n−1-sphere). For instance, the spatial filter $\hat{\omega}(r)$ may, in that case, be designed so as to exhibit, on a circle (n=2) or on a sphere (n=3), one or more maxima (or a constant value) within each of the one or more arcs or surface portions corresponding to the projections $\{P_m\}_{m=1,\ldots,M}$ of the regions of interest.

As per the general approach chosen herein, the spatial filter function allows a beamforming function to be obtained, which in turn makes it possible to determine a beamforming weight $\omega(p_i)$ for each of the devices $\{A_i\}_{i=1,\ldots,L}$. Now, the beamforming weights are preferably normalized, each, according to a suitable norm, e.g., a L2-norm, as exemplified later. The normalization makes it possible to mitigate potential noise polluting the signals.

As later exemplified in the accompanying drawings, beamshapes can subsequently be obtained, by weighting time-series according to the obtained weights $\omega(p_i)$, or normalized versions $w_i$ thereof. The resulting beamshapes exhibit main lobes nicely pointing at each of the projections $\{P_m\}_{m=1,\ldots,M}$, or maxima thereof, with acceptable sidelobes.

All the above principles and variants are further explored in the detailed description. At present, general aspects of the invention are briefly discussed, which concern methods of reception, of transmission, and of concurrent reception and transmission of signals. Other aspects concern corresponding apparatuses and computer program products.

According to a first aspect, the present invention is embodied as a method of reception of signals, whereby a beamformed signal is computed from signals received from a set of receivers $\{A_i\}_{i=1,\ldots,L}$. The receivers are configured for receiving signals from one or more regions $\{R_m\}_{m=1,\ldots,M}$ of interest (as transmitted by, e.g., end points). The same context as above is otherwise assumed, i.e., the regions extend in an n-dimensional space (n=2 or 3) and each of the receivers has a known position $p_i$ within said space. This method basically involves steps for determining a spatial filter function $\hat{\omega}(r)$, obtaining a beamforming function $\omega(p)$, and determining beamforming weights $\omega(p_i)$ for each of the receivers $\{A_i\}_{i=1,\ldots,L}$, as described above. Eventually, a beamformed signal is computed, e.g., as a series of beams, based on a summation of time-series as received by the receivers $\{A_i\}_{i=1,\ldots,L}$. Consistently with the general approach described earlier, each of the time series in the summation corresponds to a distinct one $A_i$ of the receivers and is weighted by a beamforming weight $\omega(p_i)$ as determined for said distinct one $A_i$ of the receivers.

A beamformed signal is typically computed at given time instances, which are typically spaced at regular time intervals. At each time instance, a time series is received by each of the receivers, which is then used to perform a weighted summation, whereby each time series (that corresponds to a distinct one of the receivers $\{A_i\}_{i=1,\ldots,L}$) is weighted by a beamforming weight as determined for said distinct one of the receivers $\{A_i\}_{i=1,\ldots,L}$. The beamforming weights are typically complex numbers, whose phase and modulus determine a delay and a gain, respectively. A delay and a gain are thus digitally introduced for each time series, thanks to the weighting scheme, which allows the beamformed signal to be digitally computed.

Next, according to another aspect, the invention may be implemented as a method for beamforming a signal for a set of transmitters, again denoted by $\{A_i\}_{i=1,\ldots,L}$. The devices are, in this case, configured for transmitting signals to one or more regions $\{R_m\}_{m=1,\ldots,M}$ of interest. The method basically involves same steps as described above, i.e., for successively determining $\hat{\omega}(r)$, $\omega(p)$, and the weights $\omega(p_i)$, which may be performed according to any of the embodiments and variants already evoked above. Eventually, a signal is beamformed, by weighting time-series to be subsequently transmitted by respective transmitters $\{A_i\}_{i=1,\ldots,L}$. Consistently with the general approach underlying the present invention, each time-series is weighted thanks to a beamforming weight $\omega(p_i)$ as determined for a respective transmitter.

The beamforming step is typically followed by a step of driving the weighted time series to respective transmitters for transmission. Thus, weighting the time-series amounts, practically, to introduce delays and gains at each transmitter, i.e., in accordance with the phase and modulus of the associated complex weight (as previously sampled from the beamforming function). Again, beamforming is typically performed at given time instances (e.g., spaced at regular time intervals).

As per the above method, the signals eventually transmitted by the transmitters are beamformed according to the regions of interests, i.e., with an anisotropic directional energy flux density. This way, regions of higher concentrations of end users are preferentially covered. Conversely, regions of lower concentrations of users need less flux density. Thus, the present approach allows power consumption to be reduced, all things being otherwise equal.

According to still another aspect, the present invention may be embodied as a method for determining a series of beams from or for a set of transceivers $\{A_i\}_{i=1,\ldots,L}$, wherein said set of transceivers is configured for receiving signals from and transmitting signals to one or more regions $\{R_m\}_{m=1,\ldots,M}$ of interest. The method again involves steps as described above, i.e., to successively determine $\hat{\omega}(r)$, $\omega(p)$, and the weights $\omega(p_i)$. Yet, since transceivers are involved, the method now concurrently performs two tasks: (i) it computes a series of beams, based on a summation of time-series received from the transceivers (as described above in respect of receivers); and (ii) it beamforms signals to be transmitted by the transceivers (as described above in respect of transmitters). These two steps may be performed in parallel (synchronously or not), or intermittently, depending on the transmission-reception scheme chosen.

According to other aspects, the invention can further be embodied as various types of apparatuses, which may comprise receivers, transmitters or transceivers, consistently with the present methods. Such apparatuses comprises computerized modules, suitably configured to determine the functions $\hat{\omega}(r)$, $\omega(p)$ and the weights $\omega(p_i)$, e.g., according to embodiments as described earlier.

In addition, such apparatuses comprise:

A digital beamforming module, configured for computing a beamformed signal, based on a summation of time-series received by receivers (or transceivers); and/or An analog beamforming module, configured for beamforming signals, by weighting time-series to be transmitted by transmitters (or transceivers).

In the latter case, the beamforming module can be regarded as an analog module, inasmuch as delays and gains are introduced in the signals to be transmitted, via the weighting scheme.

The invention may notably be embodied as a mobile telecommunication network, comprising a transmission apparatus, equipped with an analog beamforming module such as evoked above.

The invention may still be embodied as a transceiver apparatus, wherein the apparatus is a wireless access point (e.g., a Wifi router) or an ultrasonic sensing system.

According to a final aspect, the invention can be embodied as a computer program product. The computer program product comprises a computer readable storage medium having program instructions embodied therewith. The program instructions are executable by a computerized system to cause the latter to take steps according to the general approach described above, i.e., so as to obtain the functions $\hat{\omega}(r)$, $\omega(p)$ and the weights $\omega(p_i)$. In addition, these instruction will cause the computerized system to weight time-series received from or meant to devices $\{A_i\}_{i=1,\ldots,L}$. Such devices may be receivers, transmitters or transceivers, as discussed earlier.

Methods, apparatuses and computer program products embodying the present invention will now be described, by way of non-limiting examples, and in reference to the accompanying drawings.

BRIEF DESCRIPTION OF SEVERAL VIEWS OF THE DRAWINGS

FIG. 2 illustrates: the determination of an extended spatial filter function r), FIG. 2A, a beamforming function $\omega(p)$ and beamforming weights $\omega(p_i)$ as obtained for each device (receivers, transmitters or transceivers), FIG. 2B, and the resulting beamshape, FIG. 2C, according to embodiments. For comparison purposes.

FIG. 3 illustrates filtering a range of directions, according to embodiments, for various angle diameters (24°, 69° or 137°) and an array of 96 antennas; and FIG. 4 illustrates filtering a range of directions, according to embodiments, for a fixed angle diameter (40°) and only a subset of the array of FIG. 3, with various numbers (3, 10 or 30) of antennas;

FIG. 14 reflects a configuration phase, during which a spatial filter function $\hat{\omega}(r)$, a beamforming function $\omega(p)$, and beamforming weights $\omega(p_i)$ are determined; and FIGS. 15 and 16 concern run-time operations for computing beamformed signals and beamforming signals, respectively.

Figure 1:
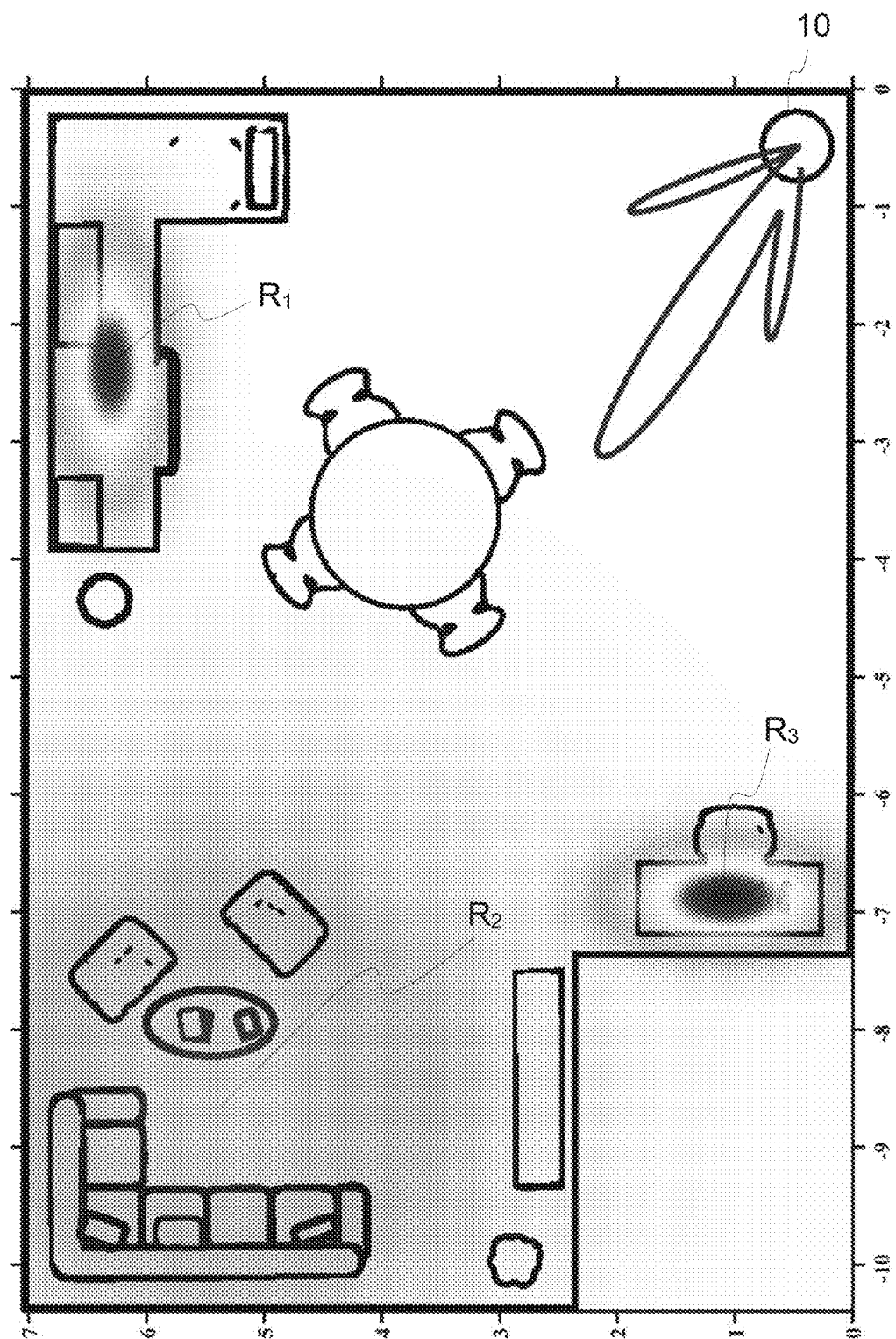
FIG. 1 represents a plan of a living room overlaid with a preference function, identifying regions of interest (desk $R_1$, sofa $R_2$ and kitchen $R_3$) as a density plot, as involved in embodiments. Darker regions represent regions of higher interest, where user most often need to receive and transmit signal. A router (circle) is located at the upper-right corner, a plot is overlaid that schematically represents a target angular filter function.

The accompanying drawings show simplified representations of computerized systems and systems, or parts thereof, as involved in embodiments. Similar or functionally similar elements in the figures have been allocated the same numeral references, unless otherwise indicated. Density plots represented in the figures have been purposely applied a high contrast and, in some cases, the colors have been inverted, for the sake of depiction.

DETAILED DESCRIPTION OF EMBODIMENTS OF THE INVENTION

The trend in all the applications discussed in the background section is to use an ever increasing number of antennas. While the terminology varies from application to application (for example, conjugate matched beamforming in radio astronomy), all techniques essentially rely on a same focused beamforming technique, despite slight variations.

As present inventors have realized, attempting such a focus has many disadvantages. First, focusing on a single point is impossible for a finite number of antennas. So, whether desired or not, information is received from a direction of focus and its close neighborhood, for which one has a fairly good knowledge about the incoming signal. However, the information captured decays quickly away from this direction, and is corrupted by signal information originating from undesired directions, amplified by numerous side-lobes. Second, in practice, the direction of interest is often estimated (not known), and there is an inherent lack of error tolerance. Third, concentrating on a single point requires constant updating to account for potential movement of the actual targets (people, devices, transport, etc.). For example, for beamforming in 802.11ac Wifi, a single device is required to communicate with the router every tenth of a second to guarantee good focusing (and hence good bandwidth). For MU-MIMO (beamforming to multiple users at the same time), required communication is on the order of 100th of a second for X number of users. As Inventors concluded, this could be dramatically reduced by using beams that target regions rather than a single direction. This, in turn, allows target devices to be captured for a longer period of time and, consequently, the refresh rate may be reduced, as contemplated, in embodiments.

Now, and as inventors realized, in practice there often are regions or areas of interest, rather than a collection of (moving) single points. Therefore, they have devised a solution, which, in embodiments, overcomes some or all of these problems, by allowing a beamforming to approximate a target spatial filter.

The present approach, by explicitly targeting designed areas of interest, provides numerous advantages. Aiming for areas rather than points minimizes the required update rate and reduces the requirement for communication. Groups of devices can be targeted at once. Also, embodiments are discussed herein, which allow side-lobes in the resulting beamshapes to be substantially reduced. Power requirements can accordingly be reduced. In a MIMO system, the normal optimization tradeoff between (focused) beamforming and spatial diversity (multiple replicas of the radio signal from different directions) can be circumvented, by incorporating aspects of the present invention.

Embodiments described below relate to communication and sensing with arrays of antennas, which can be used in applications such as Wifi, mobile phone networks, ultrasound and radio astronomy.

This section describes the background information from a mathematical point of view.

Consider an array of L receiving antennas $\{A_i\}_{i=1,\ldots,L}$. In general these have positions $\{p_i\}_{i=1,\ldots,L}$, where $\{p_1,\ldots,p_L\} \in \mathbb{R}^n$, with n=2 or 3. When n=3 they lie in three dimensional space, and when n=2 they lie on a plane. That the space the sensors lie on is allowed to vary permits different embodiments of the invention, depending on the application at hand.

For simplicity and without limiting the scope of the invention, assume these antennas have unit gains and an omnidirectional field of view.

Beamforming is generally considered a signal processing technique to change the directionality of the array, by controlling the phase and amplitude of the signal at each antenna. In mathematical terms, a beamformed signal y(t) is formed from L antennas by linearly combining as follows:

$$y(t) = \sum_{i=1}^{L} w_i^* x_i(t), \tag{1}$$

where $w_i$'s are complex-valued beamforming coefficients and $x_i(t)$ is the complex-valued time-series observed at the $i^{th}$ antenna.

Under the non-limiting assumptions of far-field and narrowband, we can write $x_i(t)$ as an integral over a sphere or circle:

$$x_i(t) = \int_{\mathbb{S}^{n-1}} s(t,r) e^{-j2\pi(r,\frac{p_i}{\lambda})} dr + n_i(t), \tag{2}$$

where the phase reference has been chosen at the center of the array (call it $p_0$) and $\lambda = f_0/c$ is the wavelength of the incoming signals and $n_i(t)$ is additive noise.

Plugging eq. (2) in eq. (1), yields:

$$y(t) = \int_{\mathbb{S}^{n-1}} s(t,r) b^*(r) dr + n_b(t). \tag{3}$$

The function b(r) writes as $$b(r) = \sum_{i=1}^{L} w_i e^{j2\pi(r,\frac{p_i}{\lambda})}$$

and is called the beamshape or radiation pattern of the beamformed antenna array. It describes the sensitivity of the antenna array relative to various directions. When focusing the beamforming at a certain direction $r_0 \in \mathbb{S}^{n-1}$, so as maximize the contribution of the signals coming from that particular direction, it is called matched beamforming or phase and delay beamforming (amongst others) depending on the field of application.

Another popular beamformer is the so-called Maximum Variance Directionless Response (MVDR), that maximizes the signal power from a given direction and suppresses as much as possible contributions from other directions. This beamformer usually offers better performances than matched beamforming in terms of directionality of the beam. However, it has the disadvantage of being data-dependent, and often time-dependent.

We now are in a position to describe mathematics underlying embodiments of the invention. Preferred embodiments of the invention relies on sampling a continuous function defined over the entire space $\mathbb{R}^n$. Therefore, instead of a finite collection of antennas, consider a continuous field of antennas covering $\mathbb{R}^n$. Associate with this continuous field a sensing function x(t, p), that describes the signal measured at position p. It is the continuous extension of eq. (2), $$x(t,p) = \int_{\mathbb{S}^{n-1}} s(t,r) e^{-j2\pi \langle r, p \rangle} dr + n(t,p),$$

where we have chosen, without loss of generality, $\lambda=1$. The function n(t, p) is the noise function. The beamforming weights to apply at each location $p \in \mathbb{R}^n$ are given by the beamforming function, $\omega: \mathbb{R}^n \to \mathbb{C}$. In this scenario, beamforming can be interpreted as taking the inner-product between the beamforming function $\omega(p)$ and the sensing function x(t, p). The beamformed output is then given by $$\begin{aligned} y(t) &= \langle \omega(p), x(t,p) \rangle \quad (4) \\ &= \int_{\mathbb{R}^n} \omega^*(p) x(t,p) dp \\ &= \int_{\mathbb{R}^n} \omega^*(p) \left( \int_{\mathbb{S}^{n-1}} s(t,r) e^{-j2\pi \langle r,p \rangle} dr + n(t,p) \right) dp \\ &= \int_{\mathbb{S}^{n-1}} s(t,r) \left( \int_{\mathbb{R}^n} \omega(p) e^{j2\pi \langle r,p \rangle} dp \right)^* dr + \int_{\mathbb{R}^n} \omega^*(p) n(t,p) dp \\ &= \int_{\mathbb{S}^{n-1}} s(t,r) \hat{\omega}_a^*(r) dr + n_b(t). \end{aligned}$$

The function $\hat{\omega}(r)$ can be regarded as the continuous analog of the array beamshape. It re-weighs the signals coming from various directions differently, and hence defines a filter. It is linked to the beamforming function through $$\hat{\omega}_a(r) = \int_{\mathbb{R}^n} \omega(p) e^{j2\pi \langle r,p \rangle} dp.$$

So far, $\hat{\omega}_a(r)$ is only defined over the unit n−1-sphere $\mathbb{S}^{n-1}$. We thus need to extend it so $\mathbb{R}^n$ so as to obtain an extended filter function $\hat{\omega}(r)$, which can be taken as the n-dimensional Fourier transform of $\omega(p)$.

To that aim, let $\hat{\omega}: \mathbb{R}^n \to \mathbb{C}$ be a function whose n-dimensional Fourier transform exists, and on the hypersphere $\mathbb{S}^{n-1}$, i.e., the n−1-sphere, is equal to $\hat{\omega}_a(r)$, the angular filter we would ideally like to achieve. We will call the extended filter $\hat{\omega}(r)$ the spatial filter function (or extended spatial filter function, or simply extended filter).

Of course, the choice of extension is not unique, and a sensible choice depends on the specific application. In general though, $\hat{\omega}(r)$ will be designed so as to match projections of the regions of interest onto the unit hypersphere. From this extension, we can compute the beamforming function by $$\omega(p) = \int_{\mathbb{R}^n} \hat{\omega}(r) e^{-j2\pi \langle r,p \rangle} dr. \quad (5)$$

Next, weights for actual antennas may be calculated by sampling $\omega(p)$ at the position of the antennas and, preferably, by normalizing the resulting weights. For a given arbitrary array of antennas with positions $\{p_1, \ldots, p_L\} \in \mathbb{R}^n$, one can obtain the beamforming weights to be applied at each antennas by sampling the beamforming function $\omega(p)$ as $$w_i = \frac{\omega(p_i)}{\beta}, \quad \forall i = 1, \ldots, L,$$

where $\beta$ can be taken as $$\beta = \sqrt{\sum_{i=1}^{L} |\omega(p_i)|^2}.$$

assuming a L2-normalization scheme, which in practice, satisfactorily avoids noise magnification. The beamshape obtained this way is then an aliased version of $\hat{\omega}(r)$, restricted to the hypersphere.

The more antennas there are, the denser the sampling will be, and the closer the result will be to producing the desired spatial filter.

Here embodiments are described, which aim at beamforming optimally an array of antennas in order to perform a digital spatial filtering of an incoming signal. Such embodiments are independent of the layout, nature and technical specifics of the considered collection of sensors. As such, it has a wide range of applications.

In embodiments where beamforming weights are computed analytically, we circumvent any numerical instability and the resulting beamshapes are always reliable in practice.

The beamshape designed according to embodiments can either be used for receiving or transmitting signals with the array of antennas. For simplicity, and without restricting the scope of the embodiments, we describe here the case of receiving antennas.

Figure 14:
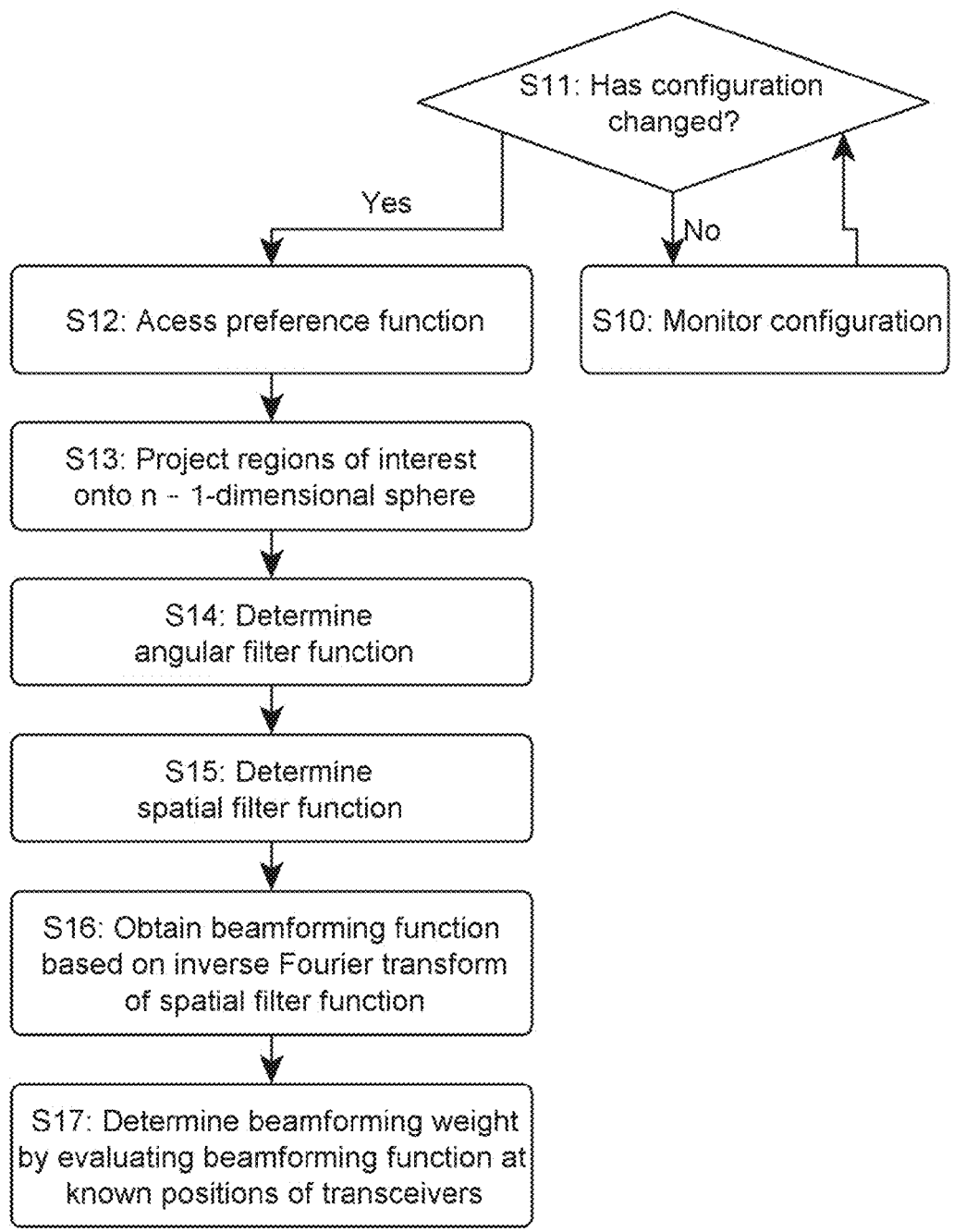
FIGS. 14-16 are flowcharts illustrating high-level steps of methods for beamforming or computing beamformed signals, according to embodiments.
Figure 15:
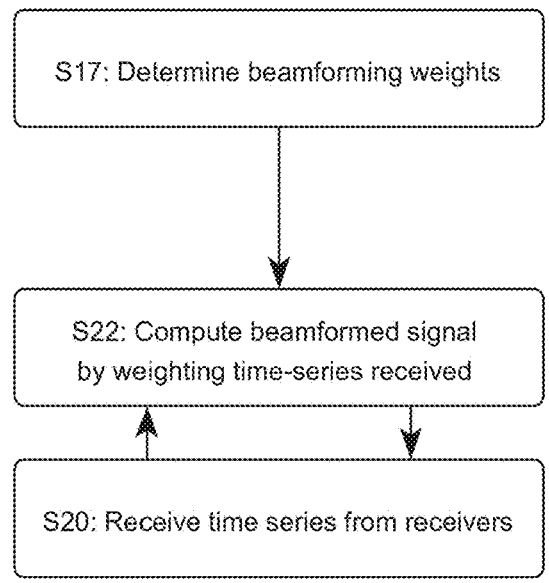
Figure 16:
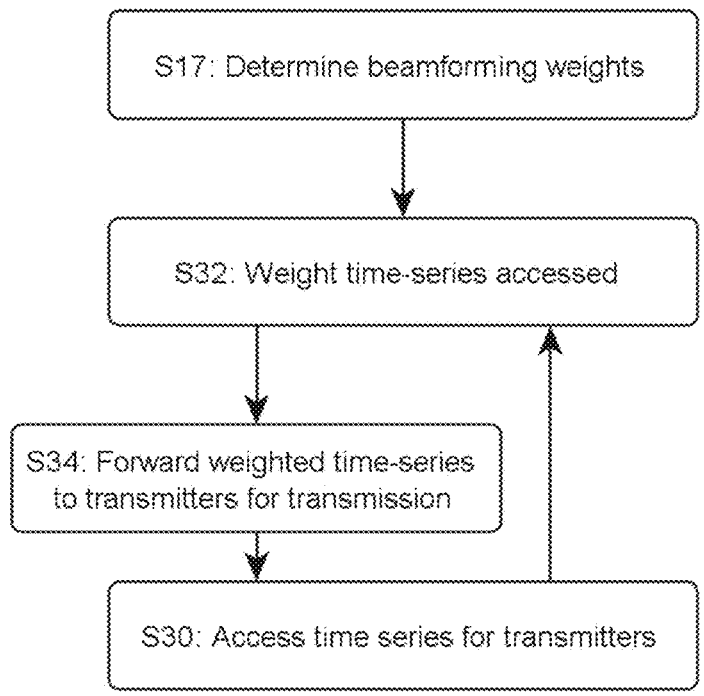

Here is a summary of basic steps as involved in embodiments (referring to FIGS. 14-16):

Take as input a set of antennas at positions $\{p_1, \ldots, p_L\} \in \mathbb{R}^n$, which are defined in 2- or 3-dimensional space (n=2 or 3).

Take S12-S14 as input a desired angular filter $\hat{\omega}_a(r)$ defined over the relevant n−1-sphere, i.e., a circle (for 2-dimensional array, when n=2) or a sphere (for 3-dimensional array, when n=3). Such a spatial filter may for instance be obtained by projecting S13 the regions of interest onto the n−1-sphere.

Extend S15 $\hat{\omega}_a(r)$ to exist also over $\mathbb{R}^n$ (either the plane or the 3-dimensional space), thereby obtaining $\hat{\omega}$.

Select a relevant, inverse Fourier transform of $\hat{\omega}$, to obtain S16 the resultant beamforming function $\omega(p)$.

Then, for each antenna position $p_i$, compute S17 the weights $w_i = \omega(p_i)/\beta$.

Finally, for each time-instance t, compute S22 the beamformed output as the weighted sum of time-series received S20 at each antenna.

As discussed earlier, the regions of interest are preferably identified in a preference function S12. In this respect, the configuration of the regions of interest may be monitored S10, and the configuration be recalculated each time it is needed, S11-S17.

An example of a simple angular filter takes on the value 1 within specific portions of the n−1-sphere (corresponding to projected regions), and 0 outside. However, the angular filter $\hat{\omega}_a(r)$ may typically be more sophisticated, depending on the format used for identifying the regions and the projection type. This will be further discussed in reference to FIGS. 7-11.

The above steps may need be somewhat modified, depending on the applications targeted (transmission, transmission-reception, etc.), as we shall see.

Computation of the beamforming function $\omega(p)$ requires the computation of the Fourier transform of the extended spatial filter function $\hat{\omega}(r)$. For an arbitrary angular filter $\hat{\omega}_a(r)$, this computation needs to be carried out numerically. However, the angular filter $\hat{\omega}_a(r)$ can be chosen so that the extended spatial filter function $\hat{\omega}(r)$ belongs to the class of functions for which an exact analytical expression is available for the computation of eq. (5). For example, any filter which admits an extension that can be expressed as a linear combination of ball indicator functions and/or multi-dimensional Gaussian functions will have this convenient property.

A Ball indicator function may be defined as follows: Let $\hat{\omega}(r)$ be an n-dimensional ball indicator function, defined as $$\hat{\omega}: \mathbb{R}^n \to \{0, 1\}, r \mapsto \begin{cases} 1 & \text{if } r \in \mathcal{B}(r_0, R), \\ 0 & \text{otherwise,} \end{cases}$$

where $r_0 \in \mathbb{S}^{n-1}$ and $B(r_0, R)$ is the ball centered in $r_0$ with radius $R > 0$:

$$B(r_0, R) = \{r \in \mathbb{R}^n | \|r - r_0\| \le R\}.$$

Then, we have:

$$\omega(p) = \int_{\mathbb{R}^n} \hat{\omega}(r) e^{-j2\pi\langle r, p\rangle} dr$$
$$= R(2\pi)^{n/2} \|2\pi pR\|^{-n/2} J_{n/2}(\|2\pi pR\|) e^{-j2\pi\langle r_0, p\rangle},$$

where $J_{n/2}$ is the n/2th Bessel function of the 1st kind.

A multi-dimensional Gaussian function will typically be used as follows. Let $\hat{\omega}(r)$ be the n-dimensional symmetric Gaussian function, with mean $r_0 \in \mathbb{S}^{n-1}$ and standard deviation $\sigma > 0$:

$$\hat{\omega}: \mathbb{R}^n \to \mathbb{R}_+, r \mapsto \frac{1}{(2\pi)^{n/2}\sigma^n} e^{-\frac{\|r-r_0\|^2}{2\sigma^2}}.$$

Then, we have:

$$\omega(p) = \int_{\mathbb{R}^n} \hat{\omega}(r) e^{-j2\pi\langle r, p\rangle} dr$$
$$= (2\pi)^n e^{-2\pi^2\sigma^2 \|p\|^2} e^{-j2\pi\langle p, r_0\rangle}.$$

Figure 2A:
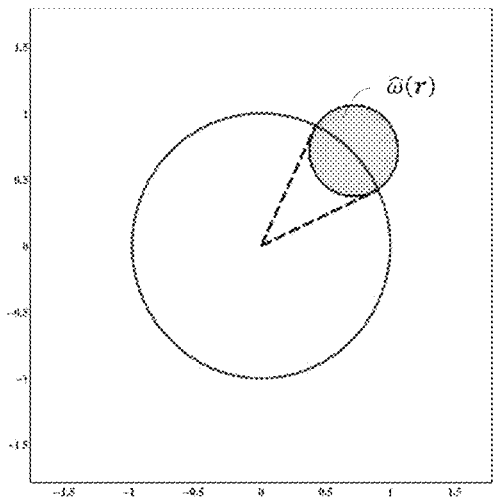
In FIG. 2A, the extended spatial filter function $\hat{\omega}(r)$ is, in this example, a simple ball indicator function, whose restriction on the unit circle (or 1-sphere) filters signals with directions of arrival or departure between 25° and 65°, as indicted by the cone defined by the dashed lines.
Figure 2B:
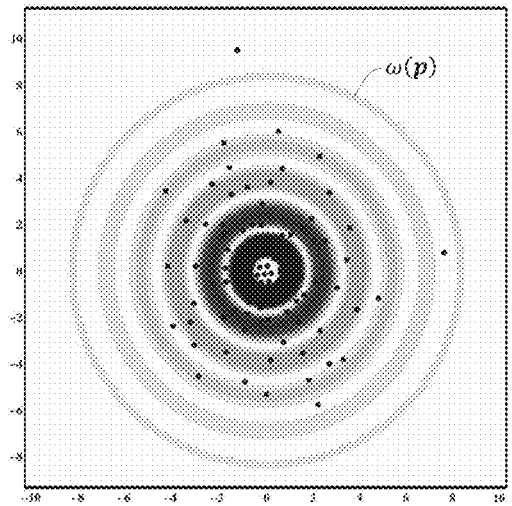
FIG. 2B depicts the modulus of $\omega(p)$, the 2D Fourier transform of $\hat{\omega}(r)$, as a density plot. The samples $\omega(p_i)$, black dots, as obtained for each device, are weights to be applied for determining beamformed signals or beamforming signals.

In FIG. 2, we illustrate the use of the ball indicator function as an extension for the angular filter. In this simple example, we are only interested in the signals with directions of arrival (or departure) between 25° and 65°. Hence, if we parametrize a direction of arrival $r \in \mathbb{S}^1$ by its polar coordinates $r = (1, \theta)$, we get an angular filter $\hat{\omega}_a(\theta)$ of the form $$\hat{\omega}_a(\theta) = \begin{cases} 1 & \text{if } \theta \in [25, 65], \\ 0 & \text{otherwise,} \end{cases}$$

with $\theta \in [0, 360]$ in degrees. A possible extension $\hat{\omega}(r)$ of this function to $\mathbb{R}^2$ is the ball indicator function $$\hat{\omega}(r) = \begin{cases} 1 & \text{if } r \in \mathcal{B}[r_0, R], \\ 0 & \text{otherwise,} \end{cases}$$

where $$r_0 = (1,1)/\sqrt{2} \in \mathbb{S}^1,$$

$$R = \sqrt{(\cos(\Theta)-1)^2 + \sin(\Theta)^2}.$$

$$\Theta = 65 - 25,$$

where $\Theta$ is the diameter angle of the angular filter only one diameter angle being assumed in this example. This extended spatial filter function is indeed a good candidate, as we observe that its restriction to the unit circle is equal to the angular filter $\hat{\omega}_a(r)$, FIG. 2A. We can then straightforwardly compute the beamforming function $\omega(p)$ for which we have an analytical formula, and sample it for any antenna array layout to obtain the corresponding beamforming weights (FIG. 2B).

Figure 2C:
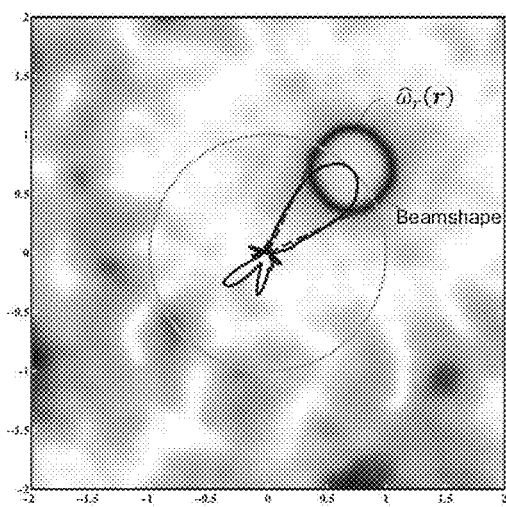
FIG. 2C shows a beamshape as obtained by weighting time-series with the sampled beamforming weights (black line). The overlaid density map corresponds to a reconstructed spatial filter function $\hat{\omega}_r(r)$, see text.

The density plot overlaid in FIG. 2C corresponds to a reconstructed spatial filter function $\hat{\omega}_r(r)$ as obtained when taking the inverse Fourier transform of the function $\omega(p)$ sampled at positions $[\{p\}_i]$ i.e., $$\hat{\omega}_r(r) = \int_{\mathbb{R}^n} e^{j2\pi\langle r, p\rangle} \sum_i \omega(p_i) \delta(p - p_i) dp.$$

This amounts to approximate $\hat{\omega}(r)$ based on the sole samples that correspond to antennas' positions. As see in FIG. 2C, the lobes of the beamshape corresponds to values taken by the reconstructed function (call it $\hat{\omega}_r$) on the unit circle. The reconstructed function $\hat{\omega}_r(r)$ matches relatively well the angular filter on the unit circle. Note, however, that the $\hat{\omega}_r(r)$ is not needed in practice and is here depicted to illustrate the relation between the beamshape and $\omega(r)$.

Figure 3:
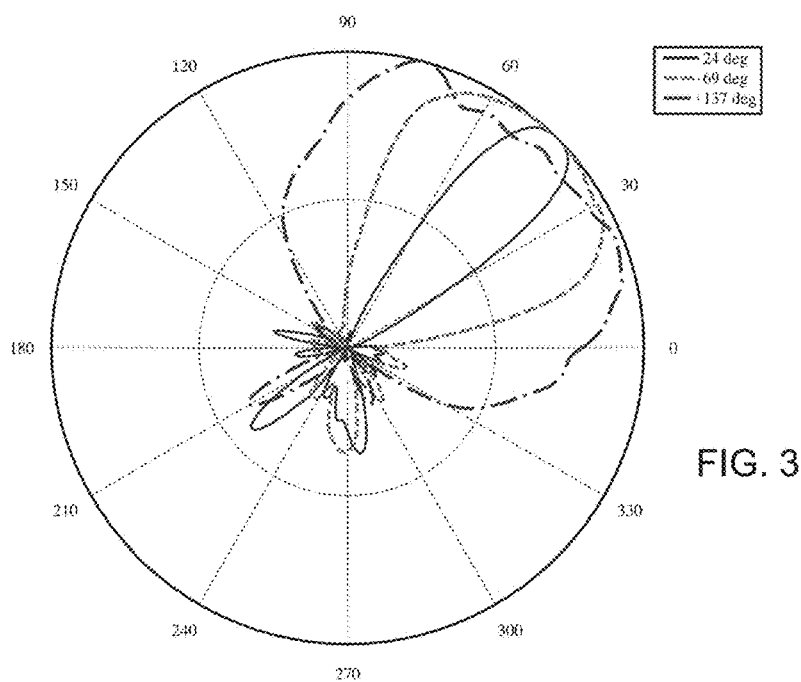
FIGS. 3 and 4 illustrate the evolution of a beamshape for various diameter angles and numbers of antennas.

In FIG. 3, we repeat the computation for various diameter angles $\Theta$ and an array with a concentric circular layout of 96 antennas. We observe that for very small $\Theta$, the beamshape is similar to that obtained with matched beamforming, while for very large $\Theta$, the beamshape struggles to cover the whole direction range.

Figure 4:
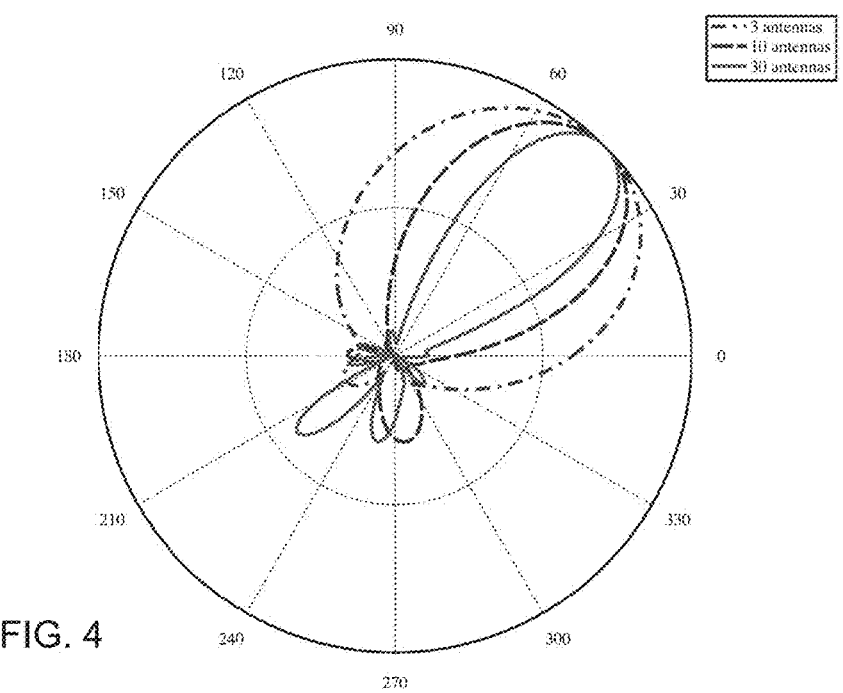

Then, we fix $\Theta = 40°$ and compute the beamshape for arrays with concentric circular layouts and various number of antennas (FIG. 4). We now observe that the beamshape becomes more and more accurate as the number of samples increases.

Figure 2D:
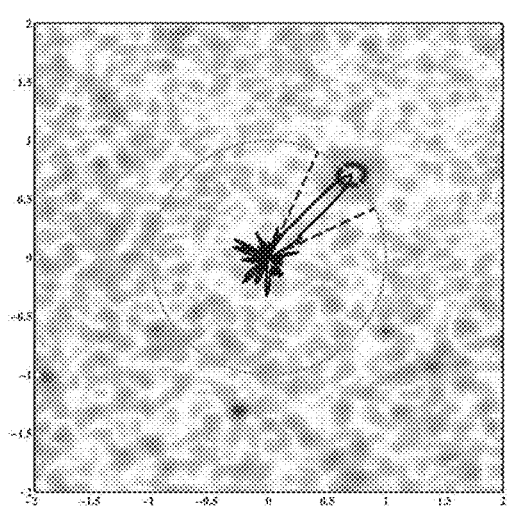
FIG. 2D shows a beamshape as obtained with a matched beamforming technique. In detail.

From FIG. 2D, we observe that the beamshape obtained according to the above embodiment covers a much wider range of directions than matched beamforming. To cover the same range with matched beamforming, one would have to steer matched beamforming towards many directions within the range.

We now describe an embodiment for the transmission and receipt of data using a Wifi router. To simplify, but without limiting the scope of the invention, we assume the router and all the devices broadcasting in the room lie on a plane, see FIG. 1.

A Wifi router with multiple antennas is used for transmission. As input a preference function $f: \mathbb{R}^3 \to \mathbb{R}$ is accessed, which identify regions of interest. To that aim, any pattern described a desired irradiation may be used, e.g., a density map. In variants, the preference function accessed may already be in the form of an angular function. I.e., the preference function may be the angular filter $\hat{\omega}_a(r)$ itself.

For example, function $f$ can indicate how each location in a living room should be irradiated by the router's signal based on user's preferences. In variants, the preference function may be automatically learned, using newer Wifi standards (802.11n, 802.11ac), whereby preferences (or average positions) may be automatically learned from instant locations of devices (either passively detected or with help of explicit status communication).

Consider for example a room as in FIG. 1 (approximately 10.5×7 m). The Wifi router 10 is located in the upper right corner. The darker regions of the overlaid density plot correspond to locations where users are most likely to use their electronic devices, and hence where they need good power coverage from the router.

In embodiments, for a given preference function accessed, an optimal beamshape may be designed, which covers well the preferential areas, while compensating for signal attenuation when travelling in the area of interest.

In particular, preferred embodiments with a Wifi network involve the following steps, on transmitting (also referring to FIGS. 14-16):

Take S12 a preference function as input. If necessary, and depending on the actual format of the preference function, project S13 regions of interest as identified therein onto the n−1-sphere (here a circle), to determine S14 the angular filter $\hat{\omega}_a(r)$.

Extend S15 the angular filter to lie on the plane and not just on the circle.

From the angular filter $\hat{\omega}_a(r)$, determine S16 the beamforming function $\omega(p)$ by inverse Fourier transform over the plane.

For each antenna, determine S17 the beamforming weights $\omega(p_i)$ by sampling the beamforming function and, if necessary, normalize the determined weights.

Beamform S32-S34 at each time instance according to the beamforming weights. I.e., time-series are weighted S32 and subsequently passed S34 to antennas for transmission.

As discussed below, preferred embodiments would approximate the preference function in terms of Gaussian functions, so as to enable analytical calculation of the beamforming function.

Note that present embodiments generally assume the devices to lie in the far field. Indeed, no beamforming would be necessary if the devices were in the near field. This assumption is believed to hold for all reasonable modes of operation. For example for a frequency of operation of $f_0 = 2.4$ GHz (as typical for Wifi signals), and for a single antenna of length L=15 cm, every device located at a distance from the antenna greater than $d_0 = 2L^2/\lambda \approx 3.6$ mm can be considered as lying in the far field.

Under the far field and narrowband assumptions, the model used in sect. 1 holds and we can write the signal received by an antenna at position $p \in \mathbb{R}^2$ by $$x(t,p) = \int_{S^2} s(t,r) \mathring{\gamma}(r) e^{-2\pi j \langle r,p \rangle} dr,$$

where $s(t, r)$ is the summation of all signals coming from direction r, and $\mathring{\gamma}: S^2 \to \mathbb{R}$ is the radial attenuation function describing the average attenuation for each direction of arrival, and given by $$\mathring{\gamma}(r) = \int_{\Gamma_r} \frac{dl}{\|l - p_0\|}.$$

To compensate for the attenuation and guarantee a good coverage of the areas defined by the user, the angular filter $\hat{\omega}_a(r)$ can be chosen to be $$\hat{\omega}_a(r) = \frac{1}{\mathring{\gamma}(r)} \int_{\Gamma_r} f(l) dl.$$

In other words, the desired filter is the radial projection of the preference function $f$, re-weighted to compensate for the attenuation of the signal along specified paths.

Figure 5:
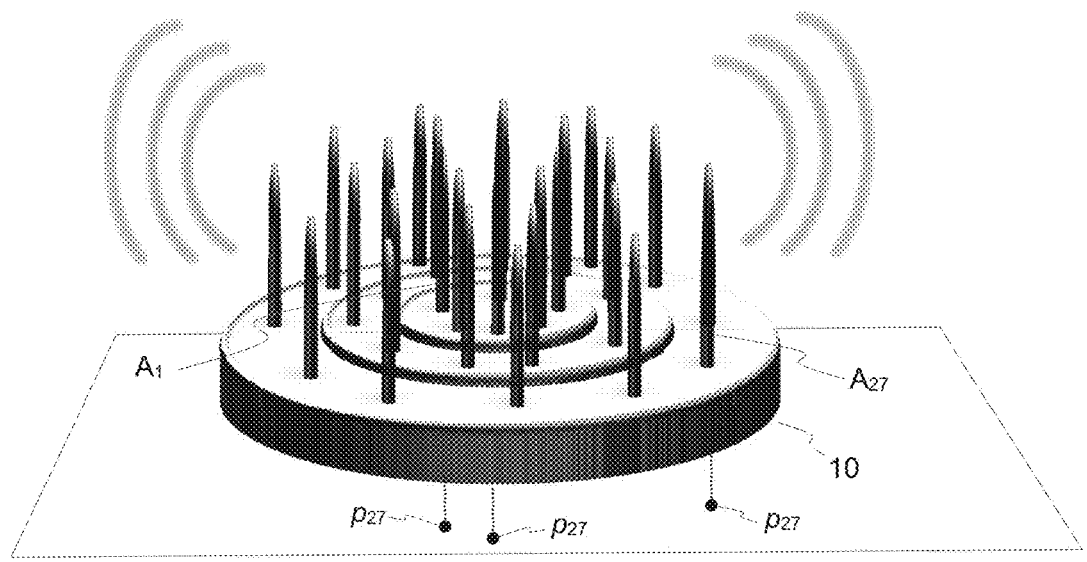
FIG. 5 is a 3D view of a router, comprising 6+9+12=27 antennas, arranged on three concentric disks of respective radii 5, 15 and 25 cm, according to embodiments.

Referring back to the living room example of FIG. 1, the router 10 (FIG. 5) is composed of 27 antennas and has a radius of 25 cm (see section 3.1). The positions $\{p_1, \ldots, p_{27}\} \in \mathbb{R}^2$ of the individual antennas $\{A_1, \ldots, A_{27}\}$ are restricted to $\mathbb{R}^2$ for simplicity and the center of the router is denoted by $p_0 \in \mathbb{R}^2$. In FIG. 5, a few antennas positions are explicitly spotted, i.e., the projections of a few antenna positions are represented on a plane parallel to the average plane of the router 10, assumed to coincide with the plane of interest.

Figure 7:
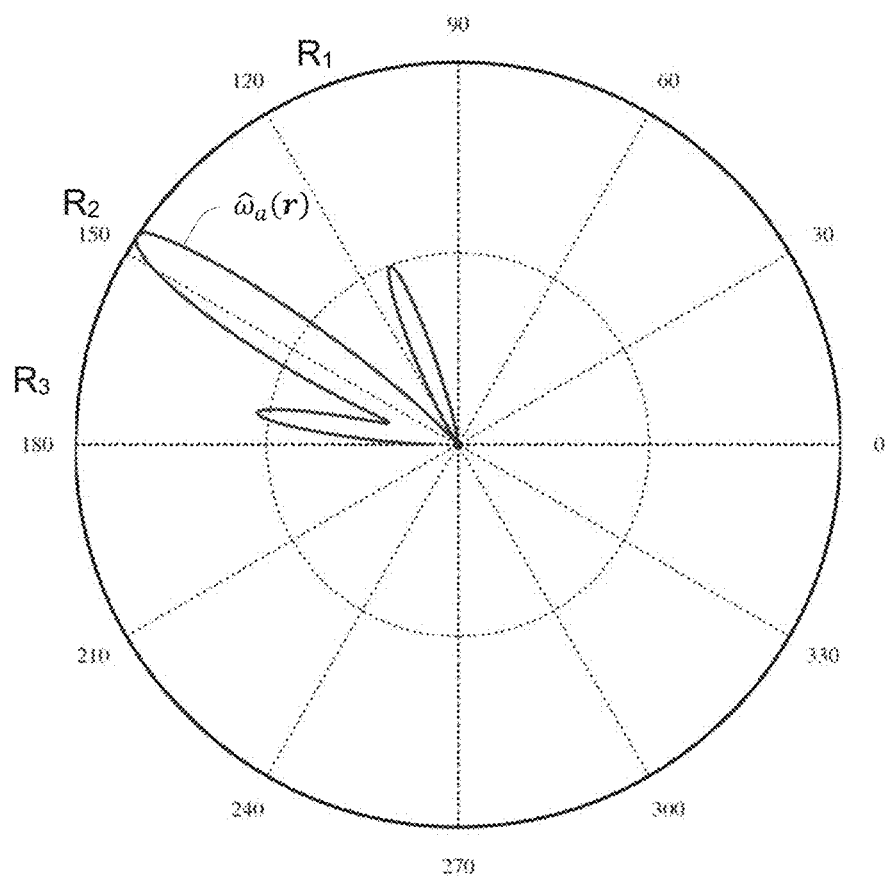
FIG. 7 shows another example of angular filter, obtained according to embodiments. The latter is a target filter suited for covering regions of interests as identified in FIG. 1; it is unwrapped in FIG. 8, where it is plotted over the interval $[\pi/2; \pi]$.
Figure 8:
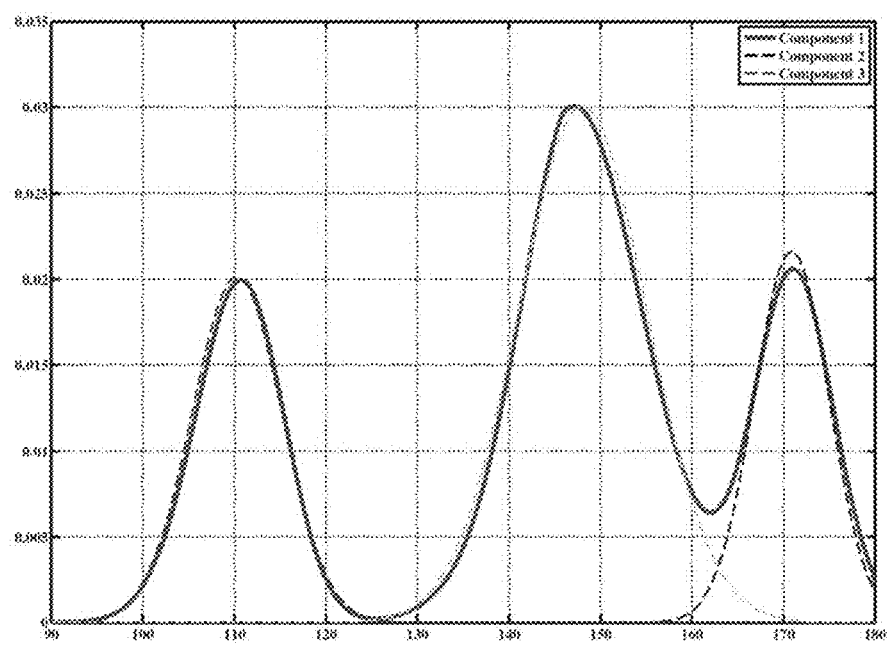

An example radial filter $\hat{\omega}_a(r)$ is presented in FIG. 7. It is unwrapped in FIG. 8 and plotted over the interval $[\pi/2, \pi]$, by seeing it as a function of $\theta \in [-\pi, \pi]$, i.e., the polar coordinate of the vector r on the circle. To facilitate the design of such a filter, we may approximate it as a contraction of three Gaussian functions:

$$\hat{\omega}_a(\theta) \simeq \sum_{i=1}^{3} \alpha_i \Phi_1\left(\frac{\theta - \mu_i}{\sigma_i}\right), \quad (6)$$

where $\Phi_1(x)$, defined as $$\Phi_1(x) = \frac{1}{\sqrt{2\pi}} e^{-\frac{x^2}{2}}$$

is the standard Gaussian function and $\alpha_i$, $\mu_i$, $\sigma_i$ are the respective weight, mean and standard deviation of each Gaussian function. The maxima of $\hat{\omega}_a(\theta)$ typically correspond to maxima of the projections on the unit circle. More generally, all the parameters involved may be refined for $\hat{\omega}_a(\theta)$ to fit the projections. We can then compute the beamforming function $\omega(p)$ by taking the (well-defined) Fourier transform of $\hat{\omega}(r)$.

Figure 9:
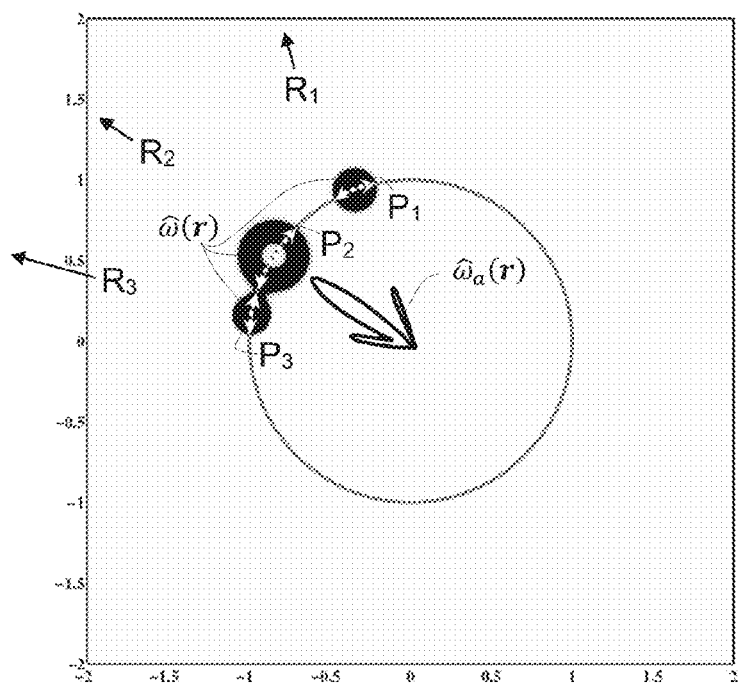
FIG. 9 depicts a spatial filter function $\hat{\omega}(r)$, obtained a bi-dimensional extension of the angular filter $\hat{\omega}_a(r)$ of FIG. 7, according to embodiments. A scaled version of $\hat{\omega}_a(r)$ is overlaid on the figure. The function $\hat{\omega}(r)$ shows three main peaks that match maxima of $\hat{\omega}_a(r)$ on the unit circle. The peaks of $\hat{\omega}(r)$ are represented as a density plot, highly contrasted, for the sake of depiction. For information, selected portions, corresponding to highest values of the projections $P_1$, $P_2$, $P_3$ of regions $R_1$, $R_2$, $R_3$ on the unit circle are explicitly (dotted, white doubles arrows on the circle). The regions $R_1$, $R_2$, $R_3$ are located farther away from the center.
Figure 10:
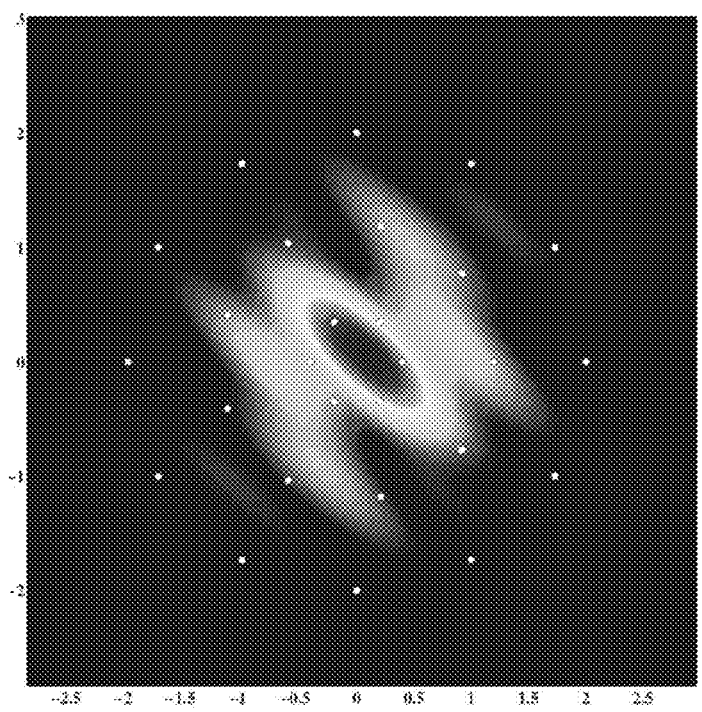
FIG. 10 shows the modulus of $\omega(p)$, the 2D Fourier transform of the function $\hat{\omega}(r)$ of FIG. 9. The beamforming weight $\omega(p_i)$ obtained for each of the devices are shown (white dots)
Figure 11:
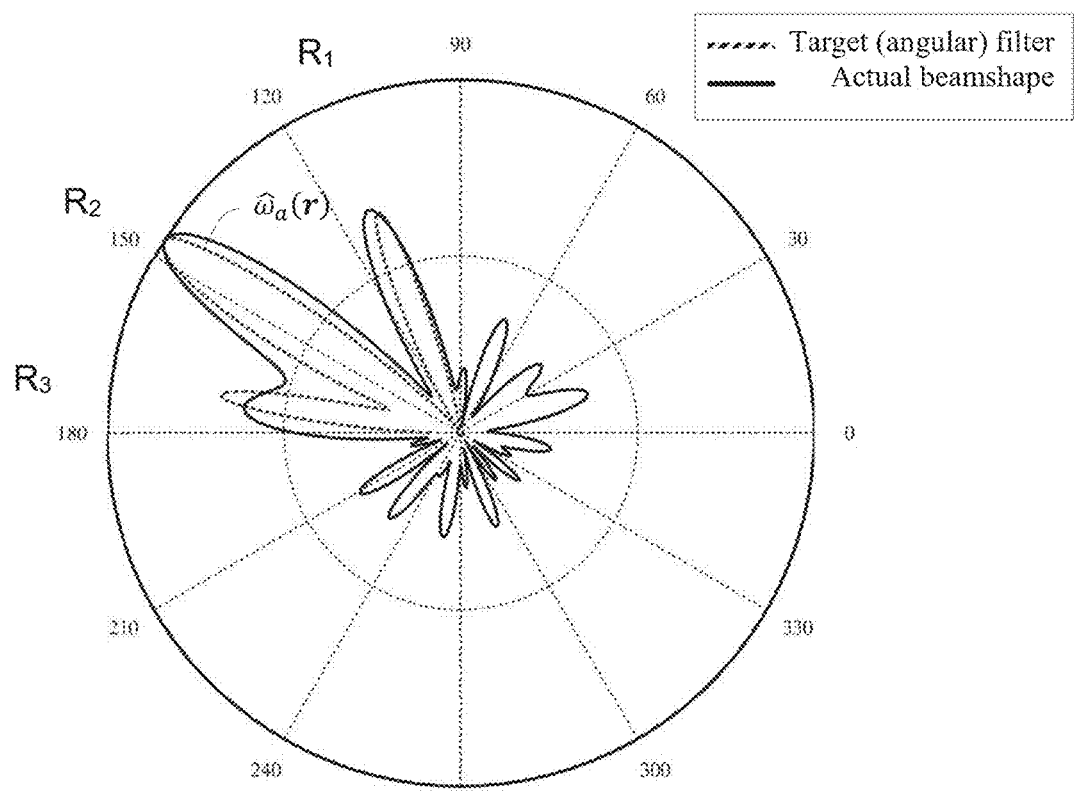
FIG. 11 compares a beamforming filter, i.e., a beamshape, obtained according the beamforming weight $\omega(p_i)$ of FIG. 10. Due to the finite number of antennas used in this example, the radiation pattern of the antenna exhibits side lobes. The target filter is otherwise well approximated by the beamshape.

One method to extend $\hat{\omega}_a(\theta)$ to the plane is to make use of the function:

$$\hat{\omega}(x, y) = \sum_{i=1}^{3} \frac{\alpha_i}{2\pi\sigma_i} e^{-\frac{1}{2\sigma_i^2}[(x-\cos(\mu_i))^2 + (y-\sin(\mu_i))^2]}, \quad (7)$$

as plotted in FIG. 9. In the above example, $\hat{\omega}$ extends $\hat{\omega}_a$ to the bi-dimensional plane by essentially centering Gaussian functions at the center of an arc and assuming a same standard deviation in the radial direction as in the angular direction or, rather, tangentially (compare eq. (6) and (7)). In other words, $\hat{\omega}$ extrapolates $\hat{\omega}_a$ to the plane assuming one has, radially, essentially the same characteristic extension as tangentially. Yet, other approaches would convene as well, provided that $\hat{\omega}$ is "thicker" than $\hat{\omega}_a$. As a general rule though, $\hat{\omega}$ may suitably extend $\hat{\omega}_a$ radially by assuming the radial deviation equal to the tangential deviation. Note that in the above example, $\hat{\omega}$ is not exactly equal to $\hat{\omega}_a$ on the circle. In variants, one may, however, constrain $\hat{\omega}$ to take exactly the same values as $\hat{\omega}_a$ on the circle, while giving it a given thickness on each side of the circle, as in the case of the ball indicator function. In general, a characteristic radial extension of $\hat{\omega}$ will delimit a circular region with radius less than 1 (i.e., think of a ball indicator function of radius less than 1, the value of unit-circle radius). However, in exceptional cases (large regions), the characteristic radial extension of $\hat{\omega}$ may delimit a circular region with radius larger than 1, but always less than 2 (i.e., the critical radius for which the entire unit-circle would be contained in the extension. Hence, larger radii (although theoretically conceivable) would not provide any substantial benefit. For example, when using the ball indicator function, a radius of 2 or greater would always lead to the same beamshape, filtering uniformly across all possible directions.

Then, the function is $\omega(p)$ is given by the 2D Fourier transform of eq. (7), FIG. 10, that is, $$\omega(p) = \omega(p_1, p_2) = (2\pi)^2 \sum_{i=1}^{3} \alpha_i e^{-2\pi^2 \sigma_i^2 (p_1^2 + p_2^2)} e^{-j2\pi[p_1 \cos(\mu_i) + p_2 \sin(\mu_i)]}.$$

Figure 12:
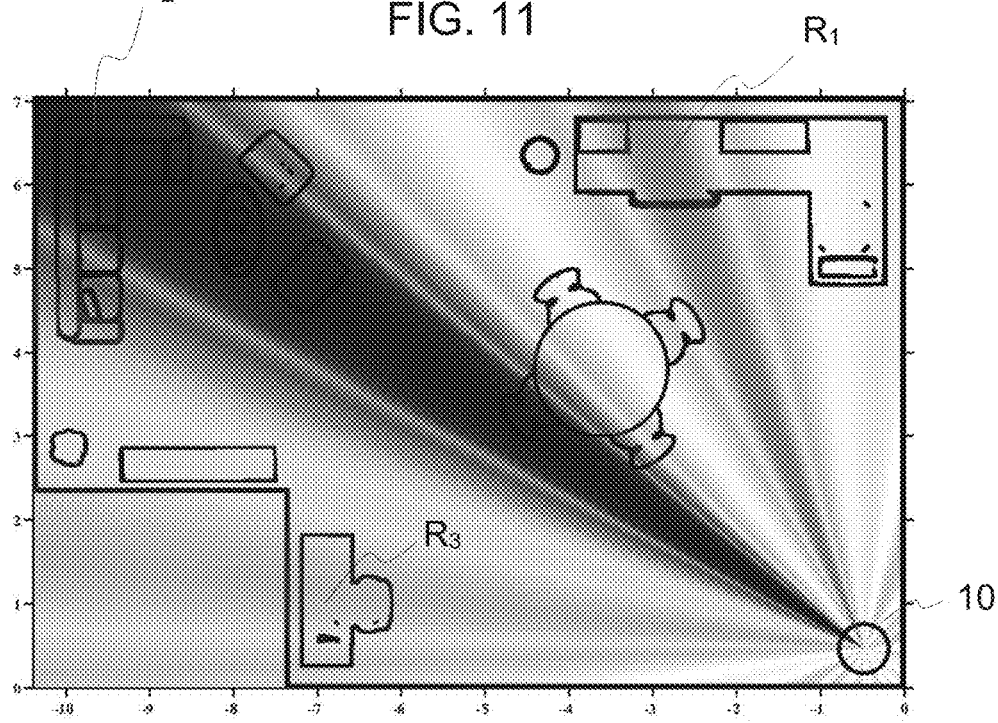
FIG. 12 illustrates how the preferential regions $R_1$, $R_2$, $R_3$ in the living room of FIG. 1 become irradiated by a router, using the beamforming technique reflected in FIGS. 7-11.

The beamshape (or radiation pattern) of the router is then given by $$b(r) = \frac{1}{\beta} \sum_{i=1}^{L} \omega\left(\frac{p_i}{\lambda}\right) e^{j2\pi\left(r, \frac{p_i}{\lambda}\right)}, \quad (8)$$

where L=27 is the number of antennas in the router and $\beta$ is the normalization factor as defined earlier, i.e., $$\beta = \sum_{i=1}^{L} \left|\omega\left(\frac{p_i}{\lambda}\right)\right|^2.$$

to avoid noise magnification due to beamforming. Because the beamshape in eq. (8) is an aliased version of $\hat{\omega}(r)$, side-lobes in the radiation pattern result (see FIG. 11). Yet, as shown in FIG. 12, the resultant radiation pattern over the living room covers well the regions of interest.

We now describe embodiments for the beamforming using a collection of 3G/4G (or in the future 5G) transmitters. The goal is to determine what beamshape should be used at each transmitter. For a given transmitter of a set (as represented by quad crosses in FIG. 13A), a preferred embodiment is as follows (also referring to FIGS. 14-16):

Compute S14 the angular filter by taking S12-S13 the radial projection of the preference function, which amounts to circular cuts of the global density function defined over the whole region;

Approximate S14 this angular filter by a sum of weighted Gaussian functions;

Extend S15 this filter to the plane with the same technique as described earlier and compute S16 its Fourier transform analytically; and Compute S17 the weights to be applied to each antenna composing the transmitter by sampling the Fourier transform.

For example, one may wish to beamform so as to cover optimally a part of a city, based on a priori knowledge of the probable positions of clients. Suppose this part of the city had an approximate area of 0.08 km2, and dense pedestrian traffic. As illustration, we collected the positions of pedestrians in this area (black dots), and inferred a corresponding continuous density function (in grayscale), which reflects an average number of pedestrians at each location. This function is an example of preference function.

In the example of FIG. 13, the goal is to beamform each of the 10 transmitters (quad arrows), so that they jointly cover as well as possible the area based on the density of pedestrians.

For simplicity, let each of the transmitters have the same layout and a range of emission of approximately 100 m. Hence, each of the transmitters only see circular cuts of a 100 m radius of the density function. The problem to solve for each transmitter is then similar to that of sect. 3.1 and can be analogously solved.

The beamshapes obtained for each transmitter, as obtained according to the above procedure, can be plotted and compared to the angular filters (not shown). This led to the conclusion that most of the beamshapes approximate very well the associated angular filter. Once again, side lobes are present, due to the finite number of antennas composing the transmitters.

Figure 13A:
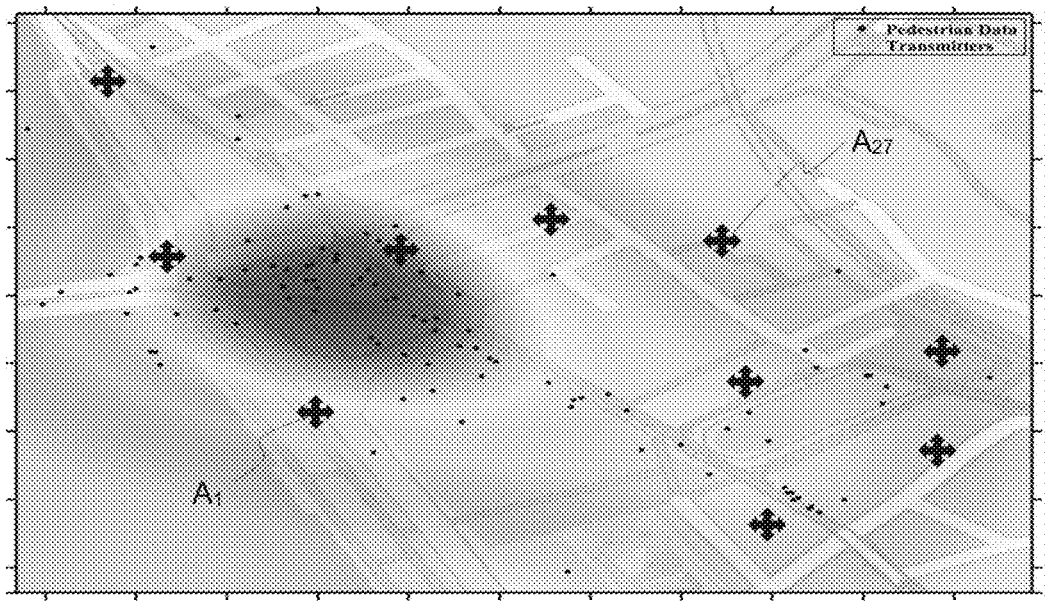
FIG. 13A represents a map of a district of a city, with an overlaid density function of pedestrians. Black dots are sampled positions of pedestrians from which the density function was inferred. Crosses (quad arrows) represent locations of 3G/4G transmitters through which beamforming can be applied (see FIG. 13B), according to embodiments.
Figure 13B:
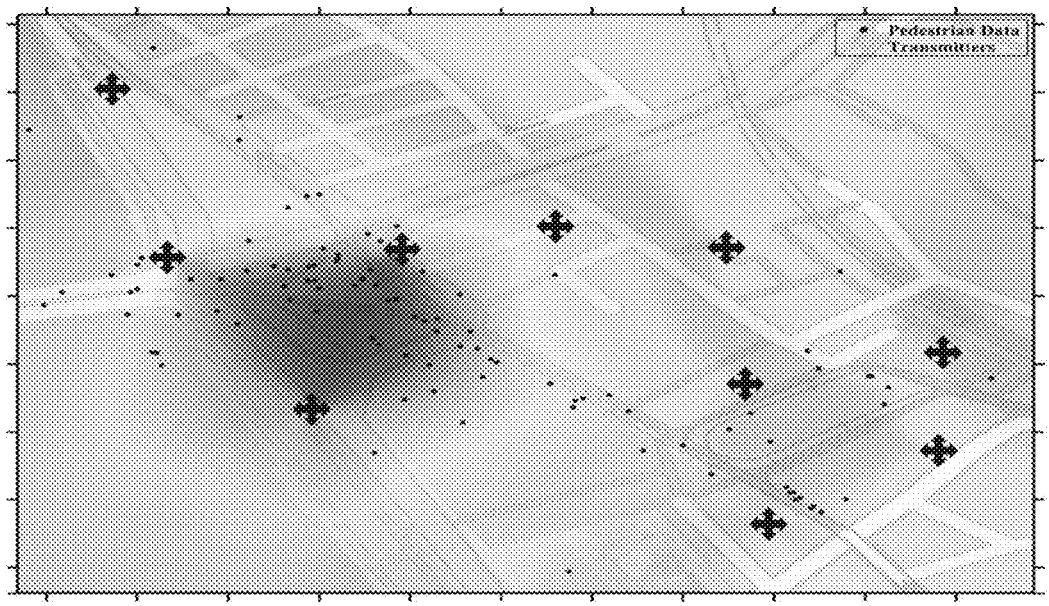
FIG. 13B shows the summation of the beamshapes from each of the transmitters, overlaid on the map of FIG. 13A, which reflects the joint coverage of the area, as obtained according to embodiments.

Finally, we sum the radiation patterns from every transmitters and overlay it over the map of FIG. 13A, to obtain FIG. 13B. There is, obviously, a nice correlation between the density maps of FIGS. 13A and 13B. I.e., areas with higher densities of pedestrians are better covered. Therefore, the network's users will have a better signal's reception, as less power is dissipated in unnecessary areas of the city. This is a huge advantage compared to current technologies in use, where broadcasting is isotropic and independent from the device distribution.

As outlined in the background section, ultrasound consists of transmit beamforming (beamforming to target the ultrasound output at a certain point) and receive beamforming (beamforming the resultant echoes). We thus describe two concurrent operations, one of the transmit and one of the receive type. The transmitted and received signals are linked in that case because the echoes are shaped by the transmit beamforming.

Figure 6:
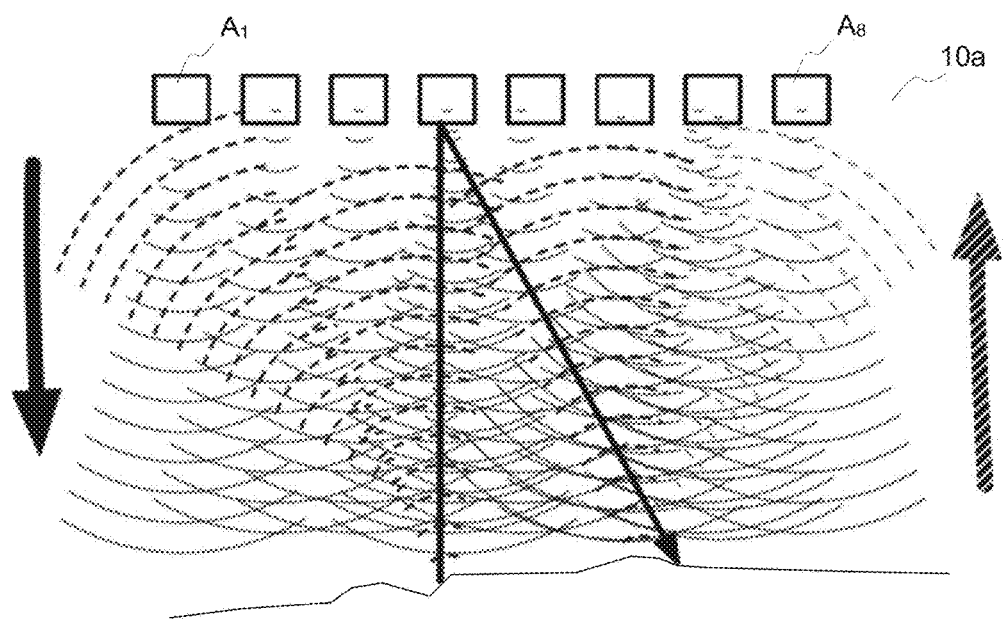
FIG. 6 schematically represents an array of ultrasound transducers, transmitting original sound waves (plain lines) and receiving waves (dashed lines) as reflected by a sample, according to embodiments.

Ultrasound phased arrays are often 1D (with all transducers aligned on a single axis, as assumed in FIG. 6), generating 2D images. More recently, 2D arrays of transducers have been proposed, which generate 3D images.

The potential benefits of present embodiments for ultrasound include:

Faster generation of images;
More accurate images;
Resolution can more carefully be adjusted;
Easier design of systems for 3D imaging;
More accurate videos (due to faster update potential);
A lower number of transducers is necessary, enabling low-cost and portable devices.

The general (known) method for transmit beamforming consists of inducing delays (a delay law) between the pulses emitted by each of the transducers. The goal is to achieve a narrow focus a certain distance away for a desired angle. This is equivalent to performing a focused beamforming for a given angle each time. The echoes from the resultant beam are then received by each transducer. They are then combined by a weighted sum to produce a single image, using the receive beam. The final image can be obtained by scanning across many angles. In this mode of operation, the whole image is desired, and focused beamforming is just a means to obtain it. Each sweep has high SNR at the point of focus, and reduced SNR around it, with side-lobes also distorting the resultant image.

Present embodiments modifies this known method by allowing for variation in the delays and magnitudes at each transducer, thus inducing phase and magnitude changes in the resultant beamforming. Thus, preferred embodiments for transmit beamforming in ultrasound is:

For a given pulse time instance, a desired probing spatial filter is given, S14.

The beamforming function is then obtained as previously shown, S15-S16, and the phase delays and magnitude weighting at each transducer are determined by sampling S17 this function at the locations of the transducers.

The resulting beamforming pattern can then be applied S32-S34 at each transducer, by suitably weighting S32 time-series S30 meant for each transducer.

In preferred embodiments for receive beamforming in ultrasound:

For a given pulse time instance, a desired probing spatial filter is given S14. This spatial filter may for instance be the same or related to the one used in transmit beam forming.

The beamforming function is then be obtained S15-S16 as previously described and then a beamformed signal is digitally obtained S22 as a weighted sum of the signals received S20 from each transducer.

Modern radio telescope correlate the signals measured by thousands of antennas at various location on the ground, in order to infer an image of the sky. To reduce the amount of data sent to the central processor and increase the signal to noise ratio, the antennas are grouped together in stations and beamformed via matched beamforming. As we have seen previously, matched beamforming maximizes the power coming from one direction in the sky, but sees little about the rest of the sky. Hence, surveying large portions of the sky with matched beamforming requires multiple observations, where matched beamforming is steered towards various locations on the sky in order to cover a whole portion of interest. This is suboptimal and time consuming, and one would benefit much more from a beamshape which could capture the power of the signals coming from a wider range of directions.

Thus, a preferred embodiment in radio astronomy for a given collection of antennas, is:

A desired spatial filter is given S14 on a unit sphere.

This desired spatial filter is extended S15 to the 3D space.

The subsequent beamforming function is obtained S16.

The beamforming function is sampled S17 at the locations of each antenna to obtain the weights.

These weights are then applied S22 to beamform at each time-instance S20.

Computerized systems and devices can be suitably designed for implementing embodiments of the present invention as described herein. In that respect, it can be appreciated that the methods described herein are largely non-interactive and automated. In exemplary embodiments, the methods described herein can be implemented either in an interactive, partly-interactive or non-interactive system. The methods described herein can be implemented in software (e.g., firmware), hardware, or a combination thereof. In exemplary embodiments, the methods described herein are implemented in software, as an executable program, the latter executed by suitable digital processing devices. More generally, embodiments of the present invention can be implemented wherein general-purpose digital computers, such as personal computers, workstations, etc., are used.

Figure 17:
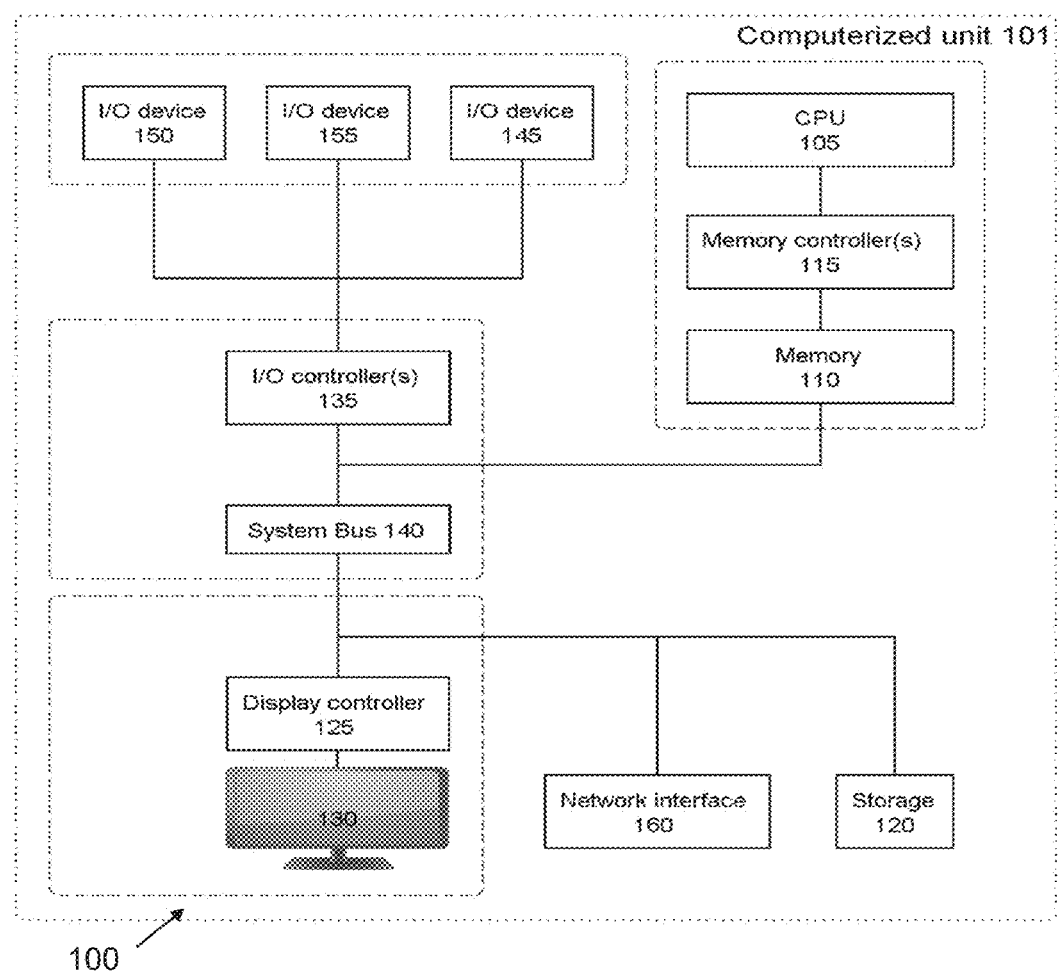
FIG. 17 shows a computerized system suited for implementing one or more method steps as in embodiments of the invention.

For instance, the system 100 depicted in FIG. 17 schematically represents a computerized unit 101, e.g., a general- or specific-purpose computer, which may be used in place or as part of any of the apparatuses 10 described earlier. As such, the unit 101 may interact with receivers, transmitters and/or transceivers, e.g., via converters and I/O units 145-155.

In exemplary embodiments, in terms of hardware architecture, as shown in FIG. 17, the unit 101 includes a processor 105, memory 110 coupled to a memory controller 115. One or more input and/or output (I/O) devices 145, 150, 155 (or peripherals) are communicatively coupled via a local input/output controller 135. The input/output controller 135 can be or include, but is not limited to, one or more buses and a system bus 140, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), or generally any device for executing software instructions.

The memory 110 can include any one or combination of volatile memory elements (e.g., random access memory) and nonvolatile memory elements. Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 17, the software in the memory 110 includes methods described herein in accordance with exemplary embodiments and, in particular, a suitable operating system (OS) 111. The OS 111 essentially controls the execution of other computer programs and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

Possibly, a conventional keyboard and mouse can be coupled to the input/output controller 135. Other I/O devices 140-155 may include or be connected to other hardware devices 10, as noted earlier.

In addition, the I/O devices 140-155 may further include or be connected to devices 10 that communicate both inputs and outputs. The system 100 can further include a display controller 125 coupled to a display 130. In exemplary embodiments, the system 100 can further include a network interface or transceiver 160 for coupling to a network 165, to enable, in turn, data communication to/from other, external components.

The network 165 transmits and receives data between the unit 101 and external systems. The network 165 is possibly implemented in a wireless fashion, e.g., using wireless protocols and technologies, such as Wifi, WiMax, etc. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 165 can also be an IP-based network for communication between the unit 101 and any external server, client and the like via a broadband connection. In exemplary embodiments, network 165 can be a managed IP network administered by a service provider. Besides, the network 165 can be a packet-switched network such as a LAN, WAN, Internet network, etc.

If the unit 101 is a PC, workstation, intelligent device or the like, the software in the memory 110 may further include a basic input output system (BIOS). The BIOS is stored in ROM so that the BIOS can be executed when the computer 101 is activated.

When the unit 101 is in operation, the processor 105 is configured to execute software stored within the memory 110, to communicate data to and from the memory 110, and to generally control operations of the computer 101 pursuant to the software. The methods described herein and the OS 111, in whole or in part are read by the processor 105, typically buffered within the processor 105, and then executed. When the methods described herein are implemented in software, the methods can be stored on any computer readable medium, such as storage 120, for use by or in connection with any computer related system or method.

The present invention may be an apparatus, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated. For example, other applications than those explicitly mentioned may benefit from beamforming methods as described herein.

What is claimed is:

1. A method for computing a beamformed signal from a set of receivers $\{A_i\}_{i=1, \ldots, L}$, each receiver of the set of receivers comprising a transducer configured for receiving signals from one or more regions $\{R_m\}_{m=1, \ldots, M}$ of interest in an n-dimensional space, with n=2 or 3, each of the receivers having a known position $p_i$ within said n-dimensional space, the method comprising:
   determining a n-dimensional spatial filter function $\hat{\omega}(r)$ by identifying one or more regions $\{R_m\}_{m=1, \ldots, M}$ of interest in the n-dimensional space;
   projecting said one or more regions of interest onto an n−1-dimensional sphere to obtain projections $\{P_m\}_{m=1, \ldots, M}$; and
   determining an angular filter function $\hat{\omega}_a(r)$, defined on said n−1-dimensional sphere, which matches projections $\{P_m\}_{m=1, \ldots, M}$ of the one or more regions $\{R_m\}_{m=1, \ldots, M}$ of interest onto an n−1-dimensional sphere centered on said set of receivers, said spatial filter function $\hat{\omega}(r)$ determined based on the determined angular filter function $\hat{\omega}_a(r)$;
   obtaining a beamforming function $\omega(p)$, based on an inverse Fourier transform of the determined spatial filter function;
   for each of the receivers $\{A_i\}_{i=1, \ldots, L}$, determining a beamforming weight $\omega(p_i)$, by evaluating the obtained beamforming function $\omega(p)$ at a known position $p_i$ of said each of the receivers $\{A_i\}_{i=1, \ldots, L}$; and
   computing the beamformed signal, based on a summation of time-series received by the receivers $\{A_i\}_{i=1, \ldots, L}$ of the set, wherein each of the time series in the summation corresponds to a distinct one $A_i$ of the receivers and is weighted by a beamforming weight $\omega(p_i)$ as determined for said distinct one $A_i$ of the receivers.

2. The method according to claim 1, wherein,
   at determining the spatial filter function, the spatial filter function $\hat{\omega}(r)$ is determined as a function having a defined, analytical Fourier transform; and
   at obtaining the beamforming function, the beamforming function $\omega(p)$ is obtained based on said analytical Fourier transform.

3. The method according to claim 2, wherein:
   at determining the spatial filter function, the spatial filter function $\hat{\omega}(r)$ is determined as a sum of basis functions; and
   at obtaining the beamforming function, the beamforming function is obtained based on a sum of Fourier transforms corresponding to said basis functions.

4. The method according to claim 3, wherein the spatial filter function $\hat{\omega}(r)$ is determined as a sum of Gaussian functions.

5. The method according to claim 2, wherein:
   at determining the spatial filter function, the spatial filter function $\hat{\omega}(r)$ is determined as a function that filters signals with directions of arrival or departure between defined angles.

6. The method according to claim 1, wherein the method further comprises, prior to determining the spatial filter function:
   accessing a preference function, which identifies said one or more regions $\{R_m\}_{m=1, \ldots, M}$ of interest in the n-dimensional space.

7. The method according to claim 1, wherein, at determining said spatial filter function $\hat{\omega}(r)$, said spatial filter function $\hat{\omega}(r)$ is determined so as to exhibit, on the n−1-dimensional sphere, maxima that respectively match maxima of the projections $\{P_m\}_{m=1,\ldots,M}$.

8. The method according to claim 7, wherein, at determining said spatial filter function $\hat{\omega}(r)$, the spatial filter function $\hat{\omega}(r)$ is constrained to take, on the n−1-dimensional sphere, the same values as the determined angular filter function $\hat{\omega}_a(r)$.

9. The method according to claim 7, wherein
said spatial filter function $\hat{\omega}(r)$ is defined for any r in the n-dimensional space, and is square-integrable over the n-dimensional space.

10. The method according to claim 9, wherein
said spatial filter function $\hat{\omega}(r)$ is a continuous, positive function, for any r in the n-dimensional space.

11. The method according to claim 1, further comprising, after having determined a beamforming weight $\omega(p_i)$ for each of the receivers $\{A_i\}_{i=1,\ldots,L}$, normalizing each determined beamforming weight $\omega(p_i)$ according to a norm of the beamforming weights for all of the receivers $\{A_i\}_{i=1,\ldots,L}$.

12. The method for beamforming a signal for a set of transmitters $\{A_i\}_{i=1,\ldots,L}$, each transmitter of the set of transmitters comprising a transducer configured for transmitting signals to one or more regions $\{R_m\}_{m=1,\ldots,M}$ of interest in an n-dimensional space, with n=2 or 3, each of the transmitters having a known position $p_i$ within said n-dimensional space, the method comprising:
determining a n-dimensional spatial filter function $\hat{\omega}(r)$ by
identifying one or more regions $\{R_m\}_{m=1,\ldots,M}$ of interest in the n-dimensional space;
projecting said one or more regions of interest onto an n−1-dimensional sphere to obtain projections $\{P_m\}_{m=1,\ldots,M}$; and
determining an angular filter function $\omega_a(r)$, defined on said n−1-dimensional sphere, which matches projections $\{P_m\}_{m=1,\ldots,M}$ of the one or more regions $\{R_m\}_{m=1,\ldots,M}$ of interest onto an n−1-dimensional sphere centered on said set of transmitters, said spatial filter function $\hat{\omega}(r)$ determined based on the determined angular filter function $\hat{\omega}_a(r)$;
obtaining a beamforming function $\omega(p)$, based on an inverse Fourier transform of the determined spatial filter function;
for each of the transmitters $\{A_i\}_{i=1,\ldots,L}$, determining a beamforming weight $\omega(p_i)$, by evaluating the obtained beamforming function $\omega(p)$ at a known position $p_i$ of said each of the transmitters $\{A_i\}_{i=1,\ldots,L}$; and
beamforming a signal, by weighting time-series to be transmitted by the transmitters $\{A_i\}_{i=1,\ldots,L}$ of the set by respective beamforming weights $\omega(p_i)$ as determined for each of the transmitters.

13. The method according to claim 12, wherein,
at determining the spatial filter function, the spatial filter function $\hat{\omega}(r)$ is determined as a function having a defined, analytical Fourier transform; and
at obtaining the beamforming function, the beamforming function $\omega(p)$ is obtained based on said analytical Fourier transform.

14. The method according to claim 12, wherein the method further comprises, prior to determining the spatial filter function:
accessing a preference function, which identifies said one or more regions $\{R_m\}_{m=1,\ldots,M}$ of interest in the n-dimensional space.

15. The method according to claim 12, wherein said spatial filter function $\hat{\omega}(r)$ is determined so as to have, on the n−1-dimensional sphere, maxima that respectively match maxima of the projections $\{P_m\}_{m=1,\ldots,M}$.

16. The method according to claim 12, further comprising, after having determined a beamforming weight $\omega(p_i)$ for each of the transmitters $\{A_i\}_{i=1,\ldots,L}$, normalizing each determined beamforming weight $\omega(p_i)$ according to a norm of the beamforming weights for all of the transmitters $\{A_i\}_{i=1,\ldots,L}$.

17. The method for determining a series of beams from or for a set of transceivers $\{A_i\}_{i=1,\ldots,L}$, each transceiver of said set of transceivers comprising a transducer configured for receiving signals from and transmitting signals to one or more regions $\{R_m\}_{m=1,\ldots,M}$ of interest in an n-dimensional space, with n=2 or 3, each of the transceivers having a known position $p_i$ within said n-dimensional space, the method comprising:
determining a n-dimensional spatial filter function $\hat{\omega}(r)$ by
identifying one or more regions $\{R_m\}_{m=1,\ldots,M}$ of interest in the n-dimensional space;
projecting said one or more regions of interest onto an n−1-dimensional sphere to obtain projections $\{P_m\}_{m=1,\ldots,M}$; and
determining an angular filter function $\hat{\omega}_a(r)$, defined on said n−1-dimensional sphere, which matches projections $\{P_m\}_{m=1,\ldots,M}$ of the one or more regions $\{R_m\}_{m=1,\ldots,M}$ onto an n−1-dimensional sphere centered on said set of transceivers, said spatial filter function $\hat{\omega}(r)$ determined based on the determined angular filter function $\hat{\omega}_a(r)$;
obtaining a beamforming function $\omega(p)$, based on a Fourier transform of the determined spatial filter function;
for each of the transceivers $\{A_i\}_{i=1,\ldots,L}$, determining a beamforming weight $\omega(p_i)$, by evaluating the obtained beamforming function $\omega(p)$ at a known position $p_i$ of said each of the transceivers $\{A_i\}_{i=1,\ldots,L}$;
computing a series of beams, based on a summation of time-series received from the transceivers $\{A_i\}_{i=1,\ldots,L}$ of the set, wherein each of the time series in the summation received by a distinct one $A_i$ of the transceivers is weighted by a beamforming weight $\omega(p_i)$ as determined for said distinct one $A_i$ of the transceivers; and
beamforming a signal, by weighting time-series to be transmitted by the transceivers $\{A_i\}_{i=1,\ldots,L}$ of the set, by respective beamforming weights $\omega(p_i)$ as determined for each of the transceivers.

18. The receiving apparatus comprising a set of receivers $\{A_i\}_{i=1,\ldots,L}$ and configured for computing a beamformed signal from said set of receivers, each receiver of the set of receivers comprising a transducer configured for receiving signals from one or more regions $\{R_m\}_{m=1,\ldots,M}$ of interest in an n-dimensional space, with n=2 or 3, each of the receivers having a known position $p_i$ within said n-dimensional space, the apparatus comprising:
a spatial filter determination module, configured for determining a n-dimensional spatial filter function $\hat{\omega}(r)$ by
identifying one or more regions $\{R_m\}_{m=1,\ldots,M}$ of interest in the n-dimensional space;
projecting said one or more regions of interest onto an n−1-dimensional sphere to obtain projections $\{P_m\}_{m=1,\ldots,M}$; and
determining an angular filter function $\hat{\omega}_a(r)$, defined on said n−1-dimensional sphere, which matches projections $\{P_m\}_{m=1,\ldots,M}$ of the one or more regions $\{R_m\}_{m=1,\ldots,M}$ of interest onto an n−1-dimensional sphere centered on said set of receivers, said spatial filter function $\hat{\omega}(r)$ determined based on the determined angular filter function $\hat{\omega}_a(r)$;

a beamforming function determination module, configured for obtaining a beamforming function $\omega(p)$, based on an inverse Fourier transform of a spatial filter function determined by the spatial filter determination module;

a beamforming weight determination module, configured for determining, for each of the receivers $\{A_i\}_{i=1,\ldots,L}$, a beamforming weight $\omega(p_i)$, by evaluating a beamforming function $\omega(p)$, as obtained from the beamforming function determination module, at a known position $p_i$ of said each of the receivers $\{A_i\}_{i=1,\ldots,L}$; and a digital beamforming module, configured for computing a beamformed signal, based on a summation of time-series received by the receivers $\{A_i\}_{i=1,\ldots,L}$ of the set, wherein each of the time series in the summation corresponds to a distinct one $A_i$ of the receivers and is weighted by a beamforming weight $\omega(p_i)$ as determined for said distinct one $A_i$ of the receivers.

19. The transmission apparatus comprising a set of receivers $\{A_i\}_{i=1,\ldots,L}$ and configured for beamforming a signal for said set of transmitters $\{A_i\}_{i=1,\ldots,L}$, each transmitter of the set of transmitters comprising a transducer configured for transmitting signals to one or more regions $\{R_m\}_{m=1,\ldots,M}$ of interest in an n-dimensional space, with n=2 or 3, each of the receivers having a known position $p_i$ within said n-dimensional space, the apparatus comprising:

a spatial filter determination module, configured for determining a n-dimensional spatial filter function $\hat{\omega}(r)$ by identifying one or more regions $\{R_m\}_{m=1,\ldots,M}$ of interest in the n-dimensional space;

projecting said one or more regions of interest onto an n−1-dimensional sphere to obtain projections $\{P_m\}_{m=1,\ldots,M}$; and determining an angular filter function $\hat{\omega}_a(r)$, defined on said n−1-dimensional sphere, which matches projections of the one or more regions $\{R_m\}_{m=1,\ldots,M}$ of interest onto an n−1-dimensional sphere centered on said set of transmitters, said spatial filter function $\hat{\omega}(r)$ determined based on the determined angular filter function $\hat{\omega}_a(r)$;

a beamforming function determination module, configured for obtaining a beamforming function $\omega(p)$, based on an inverse Fourier transform of a spatial filter function as determined by the spatial filter determination module;

a beamforming weight determination module, configured for determining, for each of the receivers $\{A_i\}_{i=1,\ldots,L}$, a beamforming weight $\omega(p_i)$, by evaluating a beamforming function $\omega(p)$, as obtained from the beamforming function determination module, at a known position $p_i$ of said each of the receivers $\{A_i\}_{i=1,\ldots,L}$; and an analog beamforming module, configured for beamforming a signal, by weighting time-series to be transmitted by the transmitters $\{A_i\}_{i=1,\ldots,L}$ of the set, by respective beamforming weights $\omega(p_i)$ as determined for each of the transmitters by said beamforming weight determination module.

20. The mobile telecommunication network, comprising a transmission apparatus according to claim 19.

21. The transceiver apparatus comprising a set of receivers $\{A_i\}_{i=1,\ldots,L}$ and configured for determining a series of beams from or for a set of transceivers $\{A_i\}_{i=1,\ldots,L}$, each transceiver of said set of transceivers comprising a transducer configured for receiving signals from and transmitting signals to one or more regions $\{R_m\}_{m=1,\ldots,M}$ of interest in an n-dimensional space, with n=2 or 3, each of the receivers having a known position $p_i$ within said n-dimensional space, the method comprising:

a spatial filter determination module, configured for determining a n-dimensional spatial filter function $\hat{\omega}(r)$ by identifying one or more regions $\{R_m\}_{m=1,\ldots,M}$ of interest in the n-dimensional space;

projecting said one or more regions of interest onto an n−1-dimensional sphere to obtain projections $\{P_m\}_{m=1,\ldots,M}$; and determining an angular filter function $\hat{\omega}_a(r)$, defined on said n−1-dimensional sphere, which matches projections of the one or more regions $\{R_m\}_{m=1,\ldots,M}$ of interest onto an n−1-dimensional sphere centered on said set of receivers, said spatial filter function $\hat{\omega}(r)$ determined based on the determined angular filter function $\hat{\omega}_a(r)$;

a beamforming function determination module, configured for obtaining a beamforming function $\omega(p)$, based on an inverse Fourier transform of a spatial filter function determined by the spatial filter determination module;

a beamforming weight determination module, configured for determining, for each of the receivers $\{A_i\}_{i=1,\ldots,L}$, a beamforming weight $\omega(p_i)$, by evaluating a beamforming function to $\omega(p)$, as obtained from the beamforming function determination module, at a known position $p_i$ of said each of the receivers $\{A_i\}_{i=1,\ldots,L}$; and a digital beamforming module, configured for determining a beamformed signal, based on a summation of time-series received by the receivers $\{A_i\}_{i=1,\ldots,L}$ of the set, wherein each of the time series in the summation corresponds to a distinct one $A_i$ of the receivers and is weighted by a beamforming weight $\omega(p_i)$ as determined for said distinct one $A_i$ of the receivers; and an analog beamforming module, configured for beamforming a signal, by weighting time-series to be transmitted by the transmitters $\{A_i\}_{i=1,\ldots,L}$ of the set, by respective beamforming weights $\omega(p_i)$ as determined for each of the transmitters by said beamforming weight determination module.

22. The transceiver apparatus according to claim 21, wherein the apparatus is one of: a wireless access point; and an ultrasonic sensing system.

23. The computer program product for determining a series of beams from or for a set of transceiver devices $\{A_i\}_{i=1,\ldots,L}$ each transceiver device of said set comprising a transducer configured for receiving signals from and/or transmitting signals to one or more regions $\{R_m\}_{m=1,\ldots,M}$ of interest in an n-dimensional space, with n=2 or 3, each of the devices having a known position $p_i$ within said n-dimensional space, the computer program product comprising a computer readable storage medium having program instructions embodied therewith, the program instructions being executable by a computerized system to cause the latter to:

determine a n-dimensional spatial filter function $\hat{\omega}(r)$ by identifying one or more regions $\{R_m\}_{m=1,\ldots,M}$ of interest in the n-dimensional space;

projecting said one or more regions of interest onto an n−1-dimensional sphere to obtain projections $\{P_m\}_{m=1,\ldots,M}$; and determining an angular filter function $\hat{\omega}_a(r)$, defined on said n−1-dimensional sphere, which matches projections of the one or more regions $\{R_m\}_{m=1,\ldots,M}$ onto an n−1-dimensional sphere centered on said set of devices, said spatial filter function $\hat{\omega}(r)$ determined based on the determined angular filter function $\hat{\omega}_a(r)$;

obtain a beamforming function $\omega(p)$, based on a Fourier transform of the determined spatial filter function;

for each of the devices $\{A_i\}_{i=1,\ldots,L}$, determine a beamforming weight $\omega(p_i)$, by evaluating the obtained beamforming function $\omega(p)$ at a known position $p_i$ of said each of the devices $\{A_i\}_{i=1,\ldots,L}$; and weight time-series from or for the devices $\{A_i\}_{i=1,\ldots,L}$ of the set, wherein each of the time series from or for a distinct one $A_i$ of the devices is weighted by a beamforming weight $\omega(p_i)$ as determined for said distinct one $A_i$ of the devices.

* * * * *